United States Patent
Harmon et al.

(10) Patent No.: US 6,584,406 B1
(45) Date of Patent: Jun. 24, 2003

(54) DOWNHOLE PROCESS CONTROL METHOD UTILIZING SEISMIC COMMUNICATION

(75) Inventors: Jerald L. Harmon, Sugar Land, TX (US); William T. Bell, Huntsville, TX (US)

(73) Assignee: Geo-X Systems, Ltd., Calgary (CA)

( * ) Notice: Subject to any disclaimer, the term of this patent is extended or adjusted under 35 U.S.C. 154(b) by 333 days.

(21) Appl. No.: 09/595,384

(22) Filed: Jun. 15, 2000

(51) Int. Cl.[7] .................................................. G01V 1/50
(52) U.S. Cl. ................................................ 702/6; 702/9
(58) Field of Search .............................. 702/6; 340/5 R, 340/15; 367/76, 38; 175/4.55; 166/299

(56) References Cited

U.S. PATENT DOCUMENTS

| | | | |
|---|---|---|---|
| 3,717,844 A | 2/1973 | Barret et al. | 340/5 R |
| 3,878,502 A | 4/1975 | Rochelle | 340/5 R |
| 3,914,732 A | 10/1975 | Brumleve et al. | 340/15 |
| 4,051,907 A | * 10/1977 | Estes | 175/4.55 |
| 4,147,222 A | * 4/1979 | Patten et al. | 175/9 |
| 4,281,403 A | 7/1981 | Siems | 376/76 |
| 4,807,200 A | 2/1989 | Montes | 367/76 |
| 6,002,640 A | 12/1999 | Harmon | 367/38 |
| 6,308,137 B1 | * 10/2001 | Underhill et al. | 702/9 |

FOREIGN PATENT DOCUMENTS

| | | |
|---|---|---|
| GB | 1 206 967 | 9/1970 |
| GB | 2 057 733 | 4/1981 |

* cited by examiner

*Primary Examiner*—Edward Lefkowitz
*Assistant Examiner*—Victor J. Taylor
(74) *Attorney, Agent, or Firm*—W. Allen Marcontell

(57) ABSTRACT

A seismic communication system suitable to communicate information to an underground device is disclosed. A seismic source (preferably on or near the surface of the earth) generates a timed series of seismic shots. These shots are then detected by one or more seismic receivers underground. Depending on the timing of these seismic shots, and the communication protocol selected, various information may be communicated to the underground target. Such a system is particularly desirable when the underground device includes a perforating gun because the perforating gun may not only be remotely detonated without the drawbacks of previous methods, but the detonation of the perforating gun charges may also be detected, giving an indication whether substantially fewer than all of the explosive charges detonated.

47 Claims, 16 Drawing Sheets

DOWNHOLE PROCESS CONTROL METHOD UTILIZING SEISMIC COMMUNICATION

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Those in the petroleum industry are particularly concerned with extracting petroleum from the earth by boring holes from the earth surface down into deep underground rock formations that contain petroleum. To evaluate the geologic conditions and to facilitate and control the extraction process, various mechanical devices are placed into the borehole. Often, these downhole devices must be remotely controlled from the surface. Controlling the actions of these mechanical devices from the surface, according to the requirements of the evaluation and extraction processes, has been done in various ways including mechanical linkages, electrical signals transmitted through wires, fiberoptic link, electromagnetic signals through the earth, and signaling to the downhole devices by varying the fluid pressure in the borehole.

Complex control signals can readily be transmitted by electrical wire or fiberoptic link. However, in many cases it is inconvenient or impractical to provide these physical linkages from the surface to the devices deep in the borehole. Thus, other methods have been sought to transmit control signals to the downhole devices.

Electromagnetic communication through the earth between the surface and the borehole has been utilized by the mining and petroleum industries. However, this method is subject to limitations imposed by high-resistive rock formations and by deep boreholes. Electromagnetic wave signal strength is weakened as formation resistivity in the intervening earth increases. Electromagnetic noise may also prevent successful communication. Hardware in the wellbore such as casing strings and tubing may interfere with signal reception. Deep boreholes imply high temperature and high pressure conditions, as well as requiring longer signal transmission distances and are not amenable to the application of existing electromagnetic communication systems.

The method of signaling by fluid pressure variation has also been developed to remotely control downhole devices without the use of mechanical linkages or wires. For example, a downhole device may be equipped with a pressure sensor to detect the pressure of fluid occupying the borehole in the proximity of the sensor. To signal the downhole device, a surface operator raises and lowers the borehole fluid pressure in a predetermined sequence to signal the downhole device. A widely practiced use of fluid pressure variation to control a downhole device is exemplified by a tubing-conveyed perforating gun. The gun's firing head is activated by raising fluid pressure in the borehole to a pre-determined level. This causes the shearing of a metal pin that initiates a chain of events resulting in firing of the gun.

However, this manipulation of borehole fluid pressure is time consuming, expensive, and sometimes hazardous. For example, for reliability the downhole device may require detection of a much higher than ambient borehole fluid pressure to initiate a certain action, such as 24000 psi as contrasted to 16000 psi ambient pressure in the proximity of the downhole device. Such high pressures induce significant stress to the downhole components. This stress, along with the stress of very high temperatures, risks the overstress of a downhole tool. In addition, the pressure at the wellhead may be raised to very high levels, such as 12000 psi. This high wellhead pressure is a safety concern as it places great stress on the constraining pipes and valves, once again risking overstress of these components. Another drawback of this method of device control is that only a very small range of command signals can be sent affordably due to the extremely low data transmission rate of the signaling method.

Current methods of controlling deep devices through pressure variation of the bore fluids are not completely reliable and the cost of occasional failure is very high. Removal of the failed device is time-consuming and costly and may also be hazardous to equipment and personnel. For example, it may cost over one million dollars to remove failed downhole components from deep wellbore. Moreover, these concerns promise to become more common in the future as deep wells become more prevalent and the deepest wells extend even deeper.

One downhole device in particular need of ideal remote control is the firing of a perforating gun. The use of electrical wires or fiberoptic conductors to communicate from the surface to these perforating guns is undesirable because of safety considerations and because of operational practicalities. In the case of tubing-conveyed perforating operations, in which the perforating gun becomes part of the permanent completion equipment of the well, no wires or cables can be tolerated in the wellbore. No alternative to activating the device through variations of borehole fluid pressure is presently available. Moreover, occasionally a perforating gun will have many fewer than all its explosive charges detonate. If, for example, only half the charges of a perforating gun detonate (and therefore the well produces only half the amount of hydrocarbons), the surface operator may believe that a well is much less productive than preliminary logging indicates. This problem is particularly acute in a very deep well where often the perforating gun is not, or cannot, be brought to the surface for inspection. The practice of abandoning the perforating gun in the wellbore after its activation is called for in the practice of permanent completion of the wellbore.

Thus there is a need in the petroleum extraction industry for a method that could overcome the deficiencies of currently available remote signaling systems. Ideally, such a method would be a safe new method of controlling downhole devices that does not require direct physical linkage by wire or fiberoptic. This method could provide a wide range of control commands and parameter settings, would be less costly in terms of total cost of the control process, would be swifter and would be very reliable. This ideal remote signaling method could also provide an indication of whether a command was received downhole for at least certain types of controllable devices.

SUMMARY OF THE INVENTION

A preferred embodiment of the invention is a seismic communication system suitable to communicate information to a device at an underground location, including a seismic source to transmit information by the generation of a series of seismic shots at selected times, a seismic receiver at the underground target to receive the series of seismic shots, and a processor in communication with the seismic receiver to decipher the information based on measurement of times, the times being based on the timing of a reference shot. The times may be measured by the cross-correlation of a first seismic shot with a second seismic shot, and translated by use of a project menu comparing the measured times to pre-selected instructions. A downhole clock may also have its clock drift accounted for by the measurement of these times.

One preferred underground device preferably includes a perforating gun with explosive charges that are detonated in response to the transmitted information. A set of one or more surface seismic receivers preferably can detect seismic waves created by the detonation of the underground explosive charges and determines about the proportion of explosive charges that detonated. The one or more seismic sources are also preferably at the surface.

The invention also may be viewed as a method of transmitting information to a location in a borehole, including the steps of generating a reference seismic signal, receiving the reference signal downhole, generating a second seismic signal, and receiving it at the underground location, and determining the information by the time of the second seismic signal. As previously, a perforating gun may be advantageously located in the borehole. A method to interpret a seismic signal includes receiving a first seismic signal at an underground location, waiting until a predetermined time according to an underground clock; listening for the presence of a second seismic signal at or about the predetermined time, and determining information based on the time of the second signal or a presence/absence of the second seismic signal. This information may be a coded command interpretable by reference to a stored project menu.

BRIEF DESCRIPTION OF THE DRAWINGS

For a more detailed description of the preferred embodiment of the present invention, reference will now be made to the accompanying drawings, wherein.

Table 1 is a Project Menu according to the preferred embodiment.

Tables 2–4 are examples of application of the project menu from Table 1.

Table 5 is a second example of a project menu according to the preferred embodiment.

Tables 6–8 are examples of the application of the project menu of Table 5.

DETAILED DESCRIPTION OF THE PREFERRED EMBODIMENT

Figure 1:
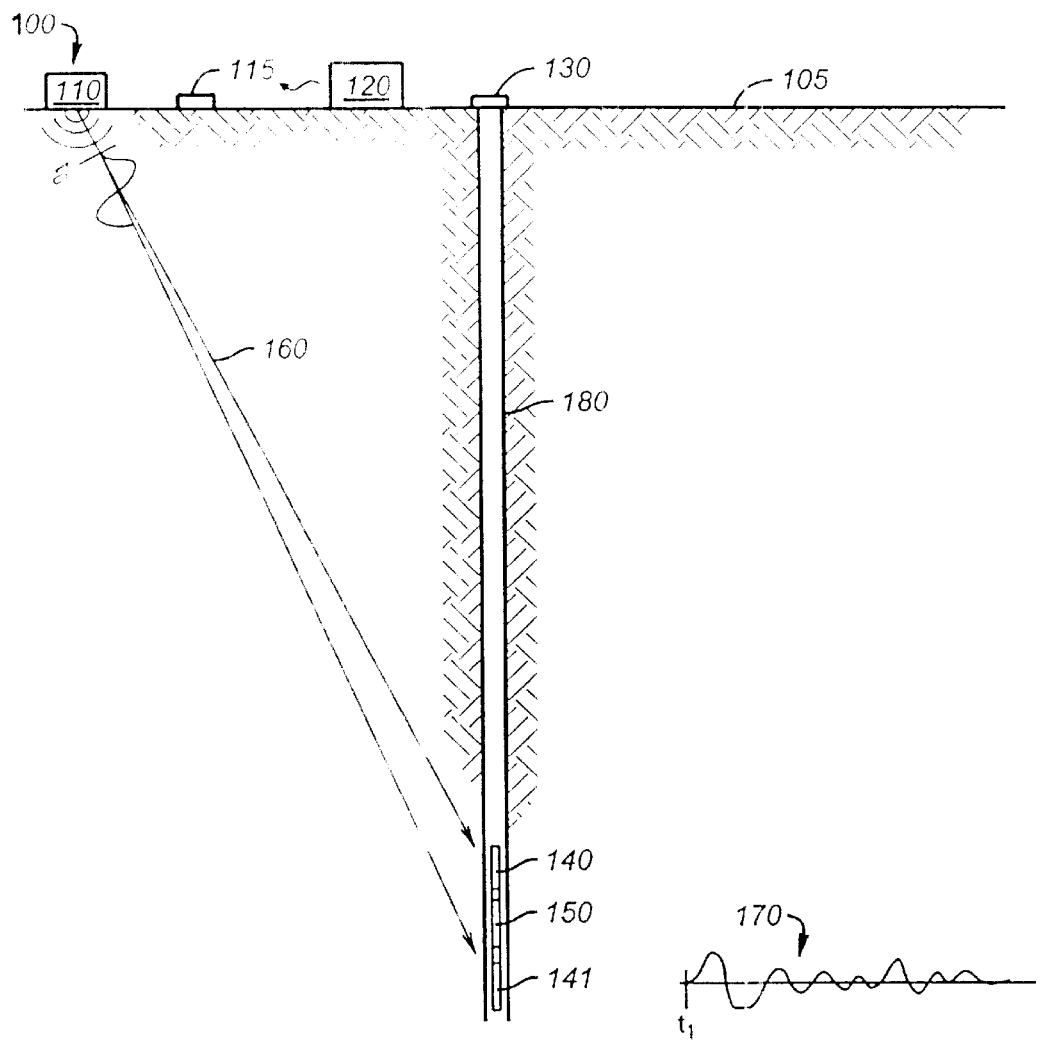
FIG. 1 is a cut-away view of a rock formation showing a well bore and system elements.

Referring to FIG. 1, a wellbore 180 includes a wellhead 130. A controllable device 150 with one or more associated seismic receiver/process controller assemblies 140, 141 are located deep in the wellbore 180. At the earth's surface 105, a repeatable seismic source 110 is located at a fixed site 100. Seismic source 110 generates seismic signals 160 in response to commands from a system controller 120. Seismic sensors 115 monitor the seismic signals 160.

System controller 120 is an interface between the seismic source 110 and a surface operator. In the preferred embodiment, the system controller accepts commands from the operator such as by a keyboard or data entry link. The system controller 120 then executes the commands according to pre-programmed instructions or menus, and transmits coded signals to the seismic signal sources 110 over any appropriate communication link. System controller 120 may be a stand alone assembly or may be integrated into another device or system.

Seismic signal sources or generators 110, also referred to as a repeatable seismic source system, are one or more of any repeatable vibratory or impulsive controllable seismic signal generators such as are commonly used in seismic exploration for petroleum. As such, the seismic sources generate a series of identical or nearly identical source signals 160. Suitable seismic frequencies are those less than about 500 Hz, but it is envisioned that frequencies on the order of 8–100 Hz will be most appropriate. A number of suitable seismic sources are available in the industry for the SISS application. Modem Vibroseis sources are ideal for this application and are highly repeatable and controllable to within less than one msec. Other suitable sources may include impulsive sources such as the land or marine airgun systems. Fixed site 100 is an area of limited size in which one or more repeatable seismic sources can be located while maintaining the operation of seismic shot synchronization/communication, as disclosed below. Multiple sources may be shot simultaneously to increase signal strength. The precise size of the fixed site may vary somewhat, but is constrained by the general requirement of quality assurance, and the differences created in the transmitted seismic signals by significant movement of the source location. A dynamically positioned seismic source with limited variation in location may be most suitable for marine applications, for example. Reasonable testing will provide a guide to the outer boundaries of the fixed site.

The seismic signals 160 generated by the seismic source system 110 are monitored for quality assurance using one or more seismic sensors 115 placed at or near the earth surface or in a borehole. It is envisioned that seismic sensors 115 will be located on the order of a few hundred feet from the seismic source 110, although this distance is not crucial to the invention. Appropriate seismic sensors include geophones, hydrophones, and a combination of geophones and hydrophones. Seismic sensors 115 preferably have a communication link to both the seismic source 110 and system controller 120. Appropriate communication links include radio, wire and fiberoptic.

The nearly identical seismic signals 160 traverse the lithology around the wellbore to arrive at the one or more seismic receiver/process controller assemblies 140, 141. By this time, each seismic signal has been corrupted by noise, reflection, attenuation, and other factors. Thus, upon arrival the seismic signal 160 may have a signal profile as shown at 170.

The one or more seismic receiver/process controller assemblies 140, 141 in the wellbore 180 are physically connected or otherwise in direct communication with a controllable device 150. As explained below, a series of the seismic signals 160 are used to control and synchronize the seismic receiver/process controller assemblies 140, 141 and the controllable device 150. The controllable device 150 may be, for example, a well perforating gun that can function in such a way as to pierce casing and the surrounding rock formation and thereby permit the flow rate of petroleum into the wellbore. Other such controllable devices might include valves, pumps and stimulators as well as other types of devices. Any downhole device capable of performing an action or series of actions that can provide a desired result are possible controllable devices.

Figure 2:
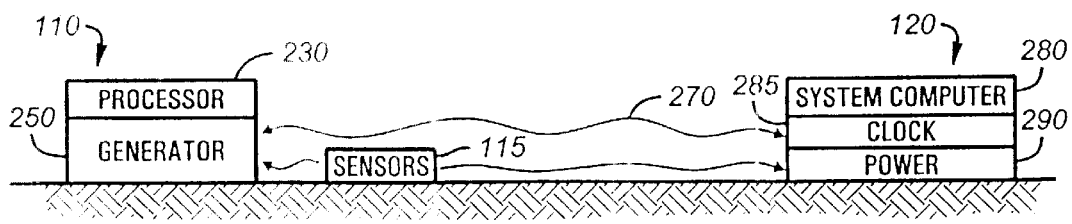
FIG. 2 is a view of the portion of the preferred embodiment at or near the earth's surface.

Referring now to FIG. 2, the preferred repeatable seismic source system 110 includes a source control processor 230 and a seismic signal generator 250. System controller 120 includes system controller computer 280, system controller master clock 285, and system controller power supply 290. Communication link 270 extends between seismic source system 110 and system controller 120. Seismic sensors 115 are also shown.

System controller 120 accepts instructions from the human operator by, for example, a keyboard or mouse. Alternately, a computer or other device may provide instructions to system controller 120 directly. The system controller computer 280 translates these instructions into a coded command sequence according to a project plan as embodied in a series of pre-programmed project menus. Examples of the project menus are shown in Tables 1 and 5.

The system controller computer 280 transmits to the seismic source system 110 a "fire" (i.e. generate seismic signal) or other command at a time determined by the master clock 285 and the project menus. System controller master clock 285 is preferably a OCXO type clock. The system controller computer 280 uses the master clock 285 to set the times of its commands to the source control system such that the seismic shots are initiated at precise and accurate times as called for in the project menus and as expected by the downhole elements of the system. Power supply 290 provides power to the system.

Upon receiving a command from system controller 120, the source control 230 of the seismic source system 110 quickly checks the command signal for quality assurance by methods known to those of ordinary skill in the art. The source control processor 230 then triggers the seismic signal generator 250 to generate a seismic signal 160 beginning at the required instant.

The system controller computer 280 also monitors the actual performance of the seismic source 110 by processing and analyzing the seismic signals detected by seismic monitor sensor array 115. For example, to establish the quality of the transmitted seismic signals 160 the system controller computer 280 may cross-correlate and compare a detected seismic signal corresponding to the repeatable seismic signals 160 to a stored rendition of the ideal seismic signal 160. Thus the system controller computer 280 is able to perform quality assurance of the seismic source system. The system controller computer 280 may also process and analyze other recorded seismic data from the seismic sensors system 115. This seismic data may be generated by, for example, the detonation of a perforating gun in the well bore. In the case where the controlled downhole device 150 is a perforating gun, system controller computer 280 can provide quality assurance of any commanded subsurface detonation.

Figure 3:
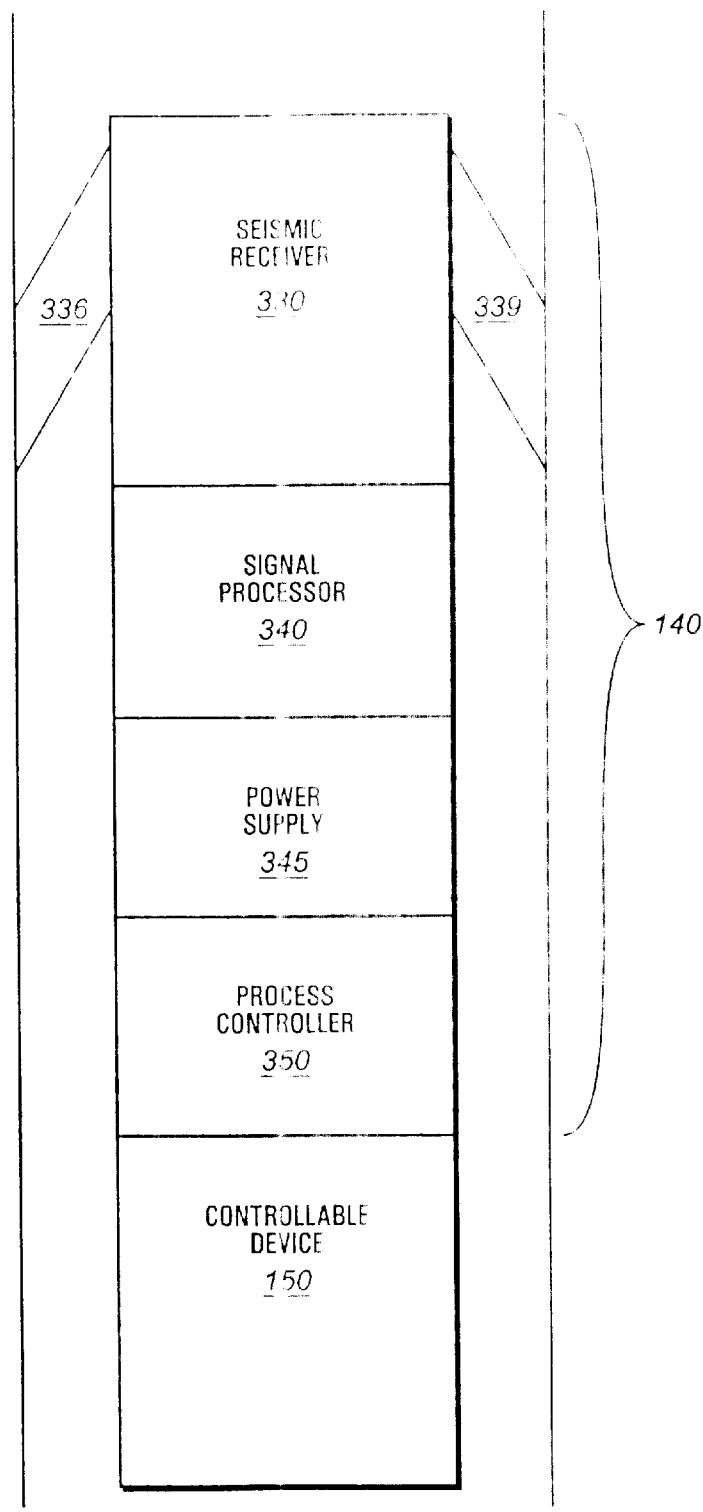
FIG. 3 is a view of the portion of the preferred embodiment deep in the well bore.
Figure 4:
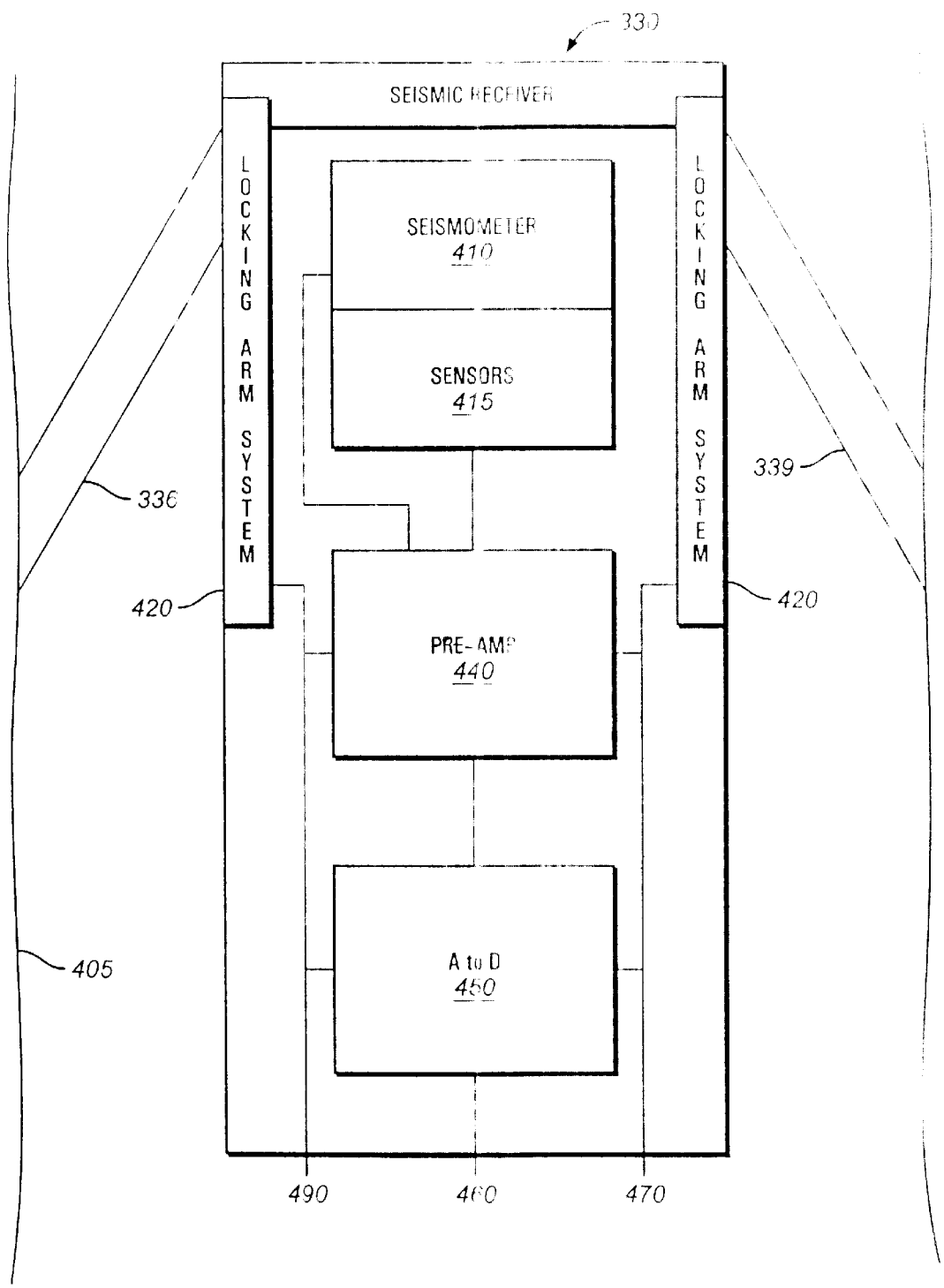
FIG. 4 is a schematic view of the seismic receiver.

Referring to FIG. 3, the seismic receiver/process controller assembly 140 includes a seismic receiver 330 (with one or more optional locking arms 336, 339), a signal processor 340, a power supply 345, and a process controller 350. Controllable device 150 couples to the seismic receiver/process controller assembly 140. Each seismic receiver/process controller 140, 141 (and controllable device 150) is constructed to withstand the pressure, temperature, and other conditions present in downhole applications. Appropriate downhole housings, manufacturing techniques, and other adaptations necessary to adopt a structure to withstand downhole conditions are known in the art.

FIGS. 4–8 show the elements of FIG. 3 in greater detail. The seismic receiver of FIG. 4 includes one or more seismic sensors or seismometers 410 connected to pre-amp 440. Pre-amp 440 also connects to various other sensors 415. Locking arms 336 and 339 are shown engaged against borehole wall 405. A locking arm actuator system 420, pre-amplifier 440 and analog-to-digital converter 450, are provided power via power cable 470. These three elements are controlled via communication link 490. Data link 460 connects directly to A/D converter 450 and carries digital signals from the A/D converter to the signal processor 340.

Locking arm 336 and locking arm actuator 420 are normally required to provide a physical coupling of the seismic receiver system to the surrounding rock and thus to provide an improved sensing of the seismic waves passing through the rock. A single locking arm 336 or multiple locking arms may be provided. Multiple arms have two advantages over single arms: (1) the seismometer 410 has a higher probability of being well-coupled to the borehole sidewall; and (2) the device is better centered in the borehole. Better centering is desirable when the controlled device can operate to better advantage if centered. This is generally true of, for example, perforating guns.

Seismometer 410, or equivalent transducers, are suitable for detecting seismic waves. For example, downhole geophones or hydrophones are available in the industry for vertical seismic profiling applications and it is within the skill of the ordinary artisan to adapt these sensors to serve the purposes of this invention. Preferably the seismometer 410 will include a 3-component geophone together with a hydrophone. A multiplicity of these four-component seismometers may be necessary to overcome noise and provide clear reception of the signal from the repeatable seismic source system 110.

By including a three-component geophone, advantage may be taken of source-generated seismic waves with particle motion in any spatial orientation. This gives advantage over a single component geophone, which in many situations would not provide adequate response to transverse particle motion. By choosing a three-component geophone both pressure waves and shear waves emanating from the seismic source 110 may be detected, giving an improved probability of accurate communication or synchronization from the surface 105 to deep in the wellbore 180.

By including a hydrophone it is possible to detect and utilize source-generated pressure waves traveling locally within borehole fluid surrounding the process controllers 140, 141. The hydrophone, unlike a geophone, does not require coupling of the seismometer to the borehole sidewalls. Thus it is possible to utilize the hydrophone without use of the locking arm system 420. This may be advantageous when: (1) no locking arm system is provided; or (2) the locking arm system activates improperly or fails otherwise to achieve good coupling to the borehole sidewalls. In the former case the sole use of a hydrophone allows a simpler and cheaper downhole system. In the latter case, the hydrophone would be a backup to the geophones in case of failure of the locking arms to operate or to couple properly.

Pre-amp 440 filters and strengthens the signals from the seismometer 410 (and other sensors 415). Analog-to-digital converter 450 transforms the analog signals that are generated by the sensors into digital signals suitable for manipulation by signal processors and micro controllers.

Communication link 490 connects the seismic receiver 330 to the signal processor 340 and is used for transmission of commands and system information to and from the signal processor 340. Seismic data is passed to the signal processor 340 via the data link 460. Electrical power is provided to the seismic receiver from power supply 345 via power cable 470.

Figure 5:
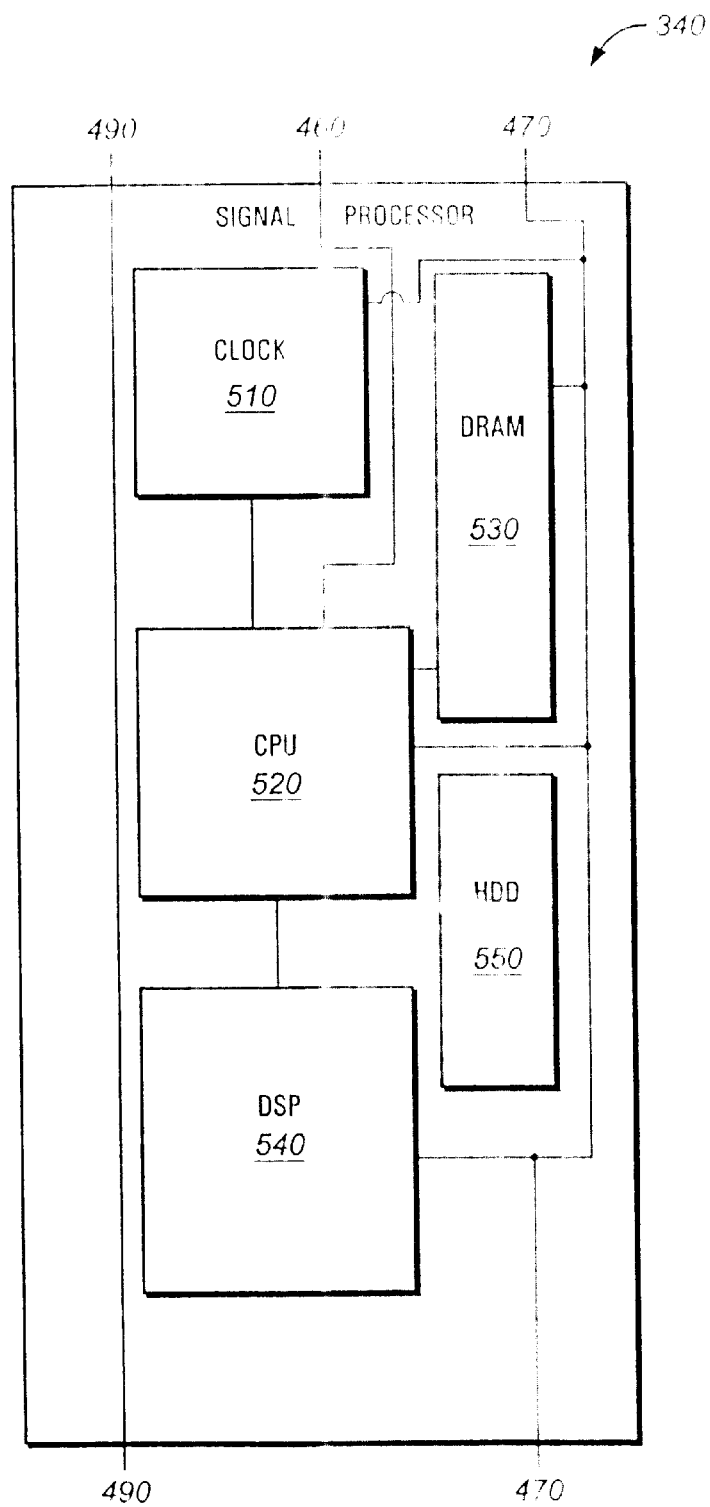
FIG. 5 is a schematic view of the signal processor.

Referring now to FIG. 5, a signal processor 340 is shown. Signal processor 340 connects to seismic receiver 330 through data link 460, power cable 470, and communication link 490, and includes all necessary data storage and computing elements to provide for processing and analysis of the received seismic signals as well as essential project control information. Signal processor 340 therefore includes central processing unit (CPU) 520 (such as a microprocessor, microcomputer, or the like), an accurate (such as TCXO clock with, e.g., $5 \times 10^{-6}$ accuracy or better) digital clock 510, a digital signal processor (DSP) 540, a dynamic random access memory unit (DRAM) 530, and a fixed head disk memory unit or hard disk drive (HDD) 550. The signal processor 340 may be alternatively configured without the HDD 550 if sufficient DRAM 530 or other memory can be provided to meet the computational and storage requirements. Also the functions of the CPU 520 and DSP 540 can be combined if there is sufficient capability available to serve the computational requirements on one device.

The CPU 520 performs a variety of functions. For example, activation of the locking arm 336 is controlled by the CPU 520 via communication link 490. This activation happens upon the downhole equipment being lowered to the planned depth in the borehole, but determining the time of activation is complex because until the locking arm is deployed the seismic communication techniques disclosed herein cannot be optimally used to transmit commands to the seismic receiver/process controller 140. Thus, a surface operator may not reliably communicate to the seismic receiver/process controller 140 while the downhole equipment 140 and 150 is in transit to the destined depth of operation. A combination of measurements may nonetheless be used by the process controller 140 to determine the moment at which the downhole equipment has reached the activation depth.

One parameter that may be used is a minimum time prior to deployment, as determined by the clock 510. Alternately, a time window for activation of the locking arm 336 may be used. Another parameter that may be employed is the detection of ambient seismic noise by the seismic sensors 410. While the downhole components 140 and 150 are traveling downward through fluid in the wellbore 180, detectable noise is created by their passage. When the downhole components have reached the desired depth, and their descent is halted by a surface operator, this noise stops. Thus, CPU 520 may rely on an ambient seismic noise threshold below which activation may occur. In addition, it is known that borehole fluid pressure correlates to depth so that borehole fluid pressure increases as depth increases. A pressure sensor may be included in sensors 415 and the CPU 520 may employ a borehole fluid pressure threshold above which activation may occur. Similarly, the temperature in the borehole climbs as depth increases so that the CPU may employ a borehole temperature pressure threshold above which activation may occur. These parameters may be used separately or in combination by the CPU 520 to determine when to activate the locking arm 336. Once the locking arm has deployed the seismic communication method disclosed herein may be reliably used to command any programmed actions. This might include a command to reposition the downhole equipment if it has prematurely activated.

Figure 6:
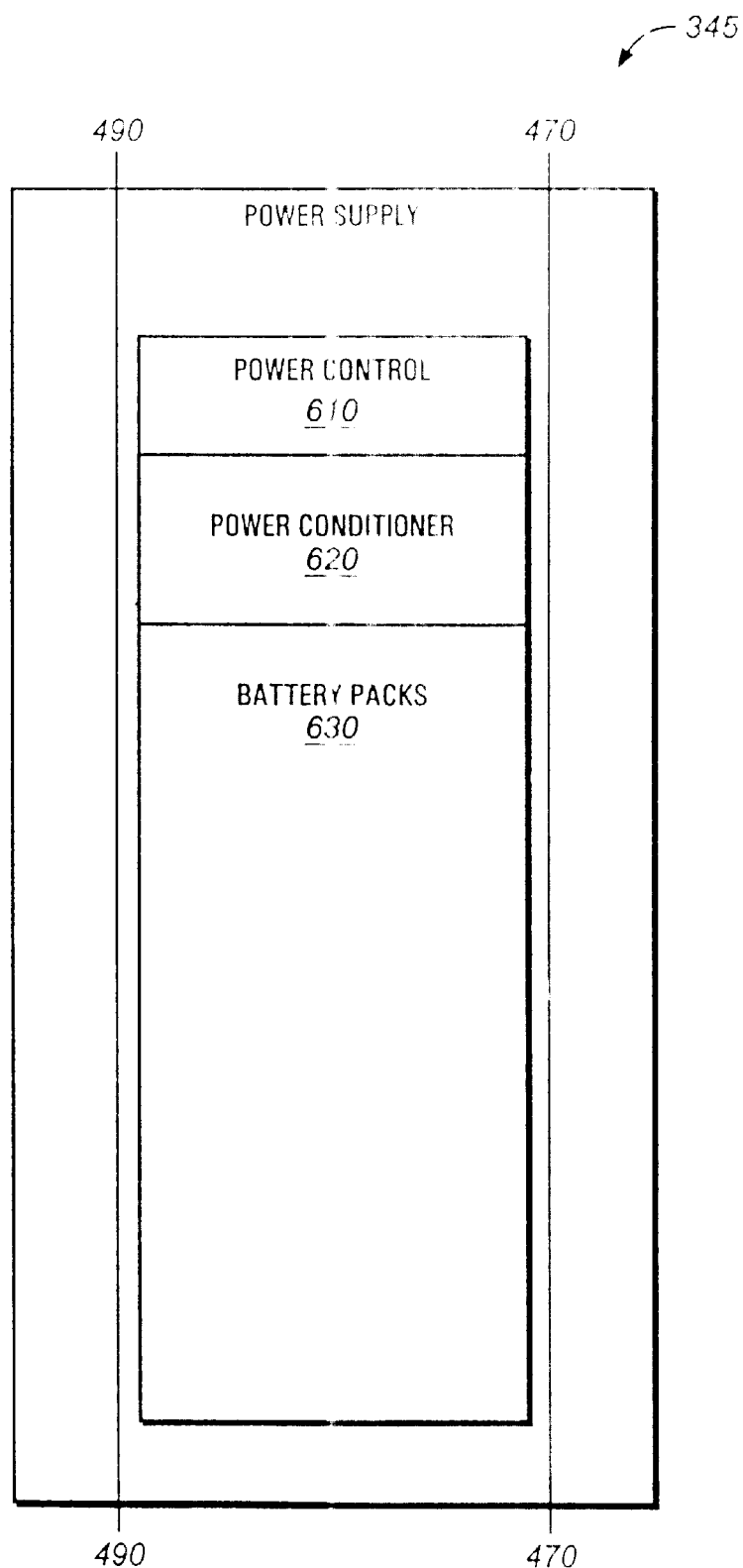
FIG. 6 is a schematic view of the power supply.

Referring now to FIG. 6, power supply 345 connects through power cable 470 and communication link 490 to the signal processor of FIG. 5. Included in power supply 345 are a battery pack 630, a power conditioner 620, and power control 610.

The power supply 345 must provide electrical power via power cable 470 to the seismic receiver 330, the signal processor 340 and the process controller 350. Battery packs 630 and power conditioner 620 under the control of the power control system 610 provide the required power in the manner required by the served devices. Power conditioner 620 ensures that the electricity from the battery pack 630 has the desired parameters such as AC/DC, cycle, voltage, amperage, etc. Power control 610 switches the power supply to a "sleep" or low-power mode when and if desired. Power control 610 may be eliminated from the power supply 345, but sufficient battery power must nonetheless be available to continue the downhole activity as long as required by the operation (unless a power-generation device can be provided). This might be for a period of a few days to as long as a period of a few years depending on the application. Many applications, however, are expected to require less than one week.

Figure 7:
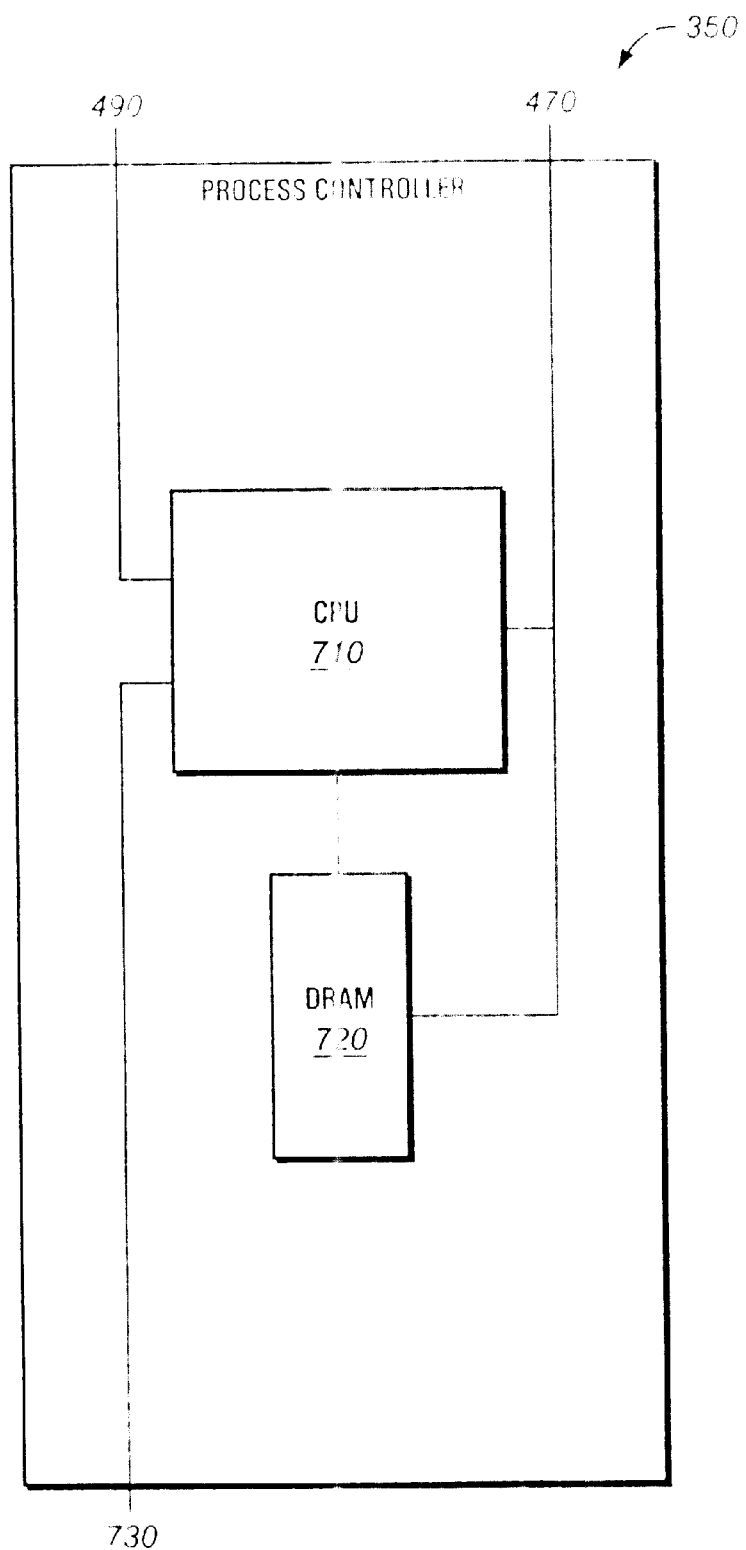
FIG. 7 is a schematic view of the process controller.

Turning to FIG. 7, the process controller 350 connects to the power supply 345 via communication link 490 and power cable 470. CPU 710 connects via communications link 490 with signal processor 340 and other active elements of the downhole system. CPU 710 also connects to DRAM 720, power cable 470 and command link 730. Command link 730 allows commands to be sent from the process controller 350 to the controllable device 150.

Figure 8A:
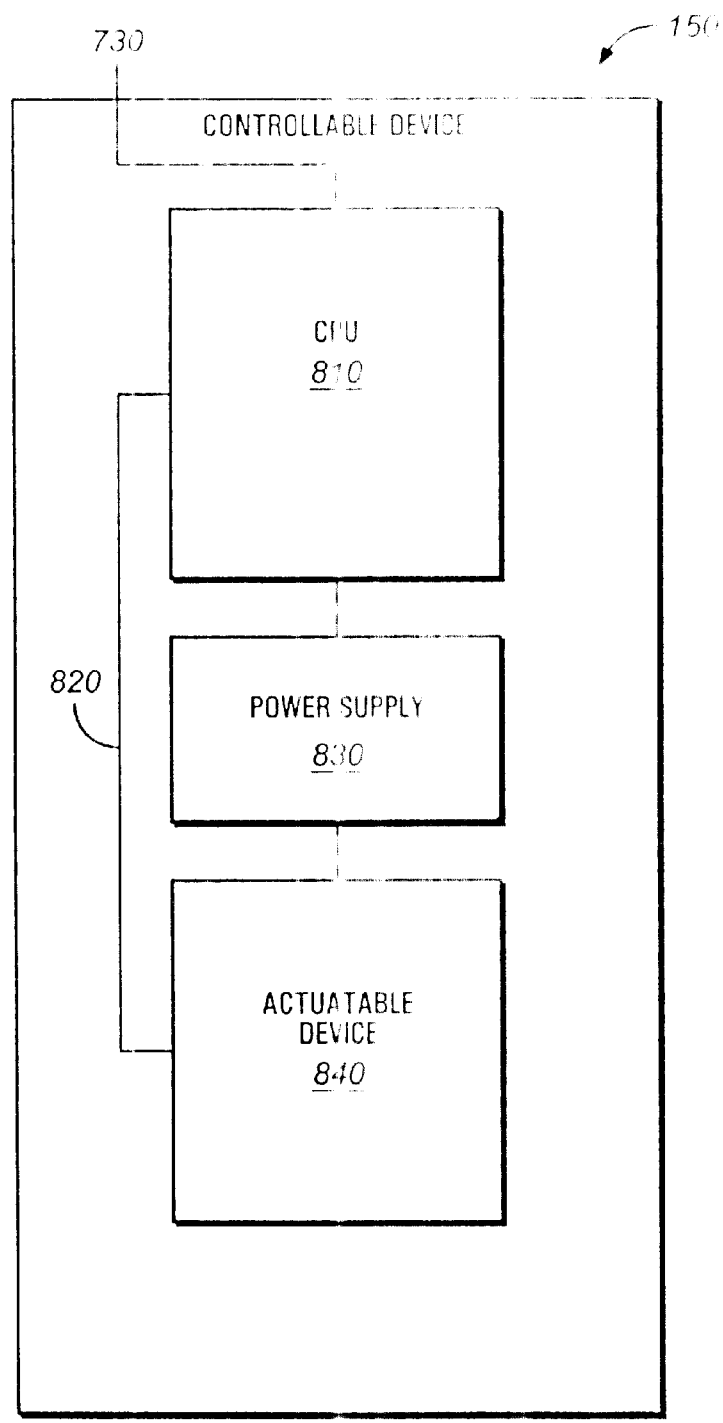
FIG. 8A is a schematic view of a controllable device.

Referring now to FIG. 8A, an exemplary controllable device 150 is shown. The controllable device 150 contains a central processing unit (CPU) 810, its own power supply 830, and an actuatable device 840. The controllable device 150 responds to commands signaled by the CPU 810 via device actuator link 820. The controllable device may respond in any way the device is capable of performing.

In view of the large variety of possible controllable devices, numerous changes are of course possible to the design of the controllable device 150. For instance, the power supplies 340 and 830 may be combined in the design of the system if desired. CPU 810 may be eliminated if its functions are performed by another CPU or component in the system. Controlled device 150 may also be modified for specific adaptation to the system disclosed herein, such as by altering connection terminals, the quality or number of communication links, etc. However, one advantage to the teachings herein is its ability to utilize controllable devices present in the prior art without modification.

Enclosure of temperature-sensitive device including the clock within a vacuum or other heat-insulated container is a feature of the preferred embodiment for applications in extreme temperature conditions such as encountered in very deep boreholes.

Figure 8B:
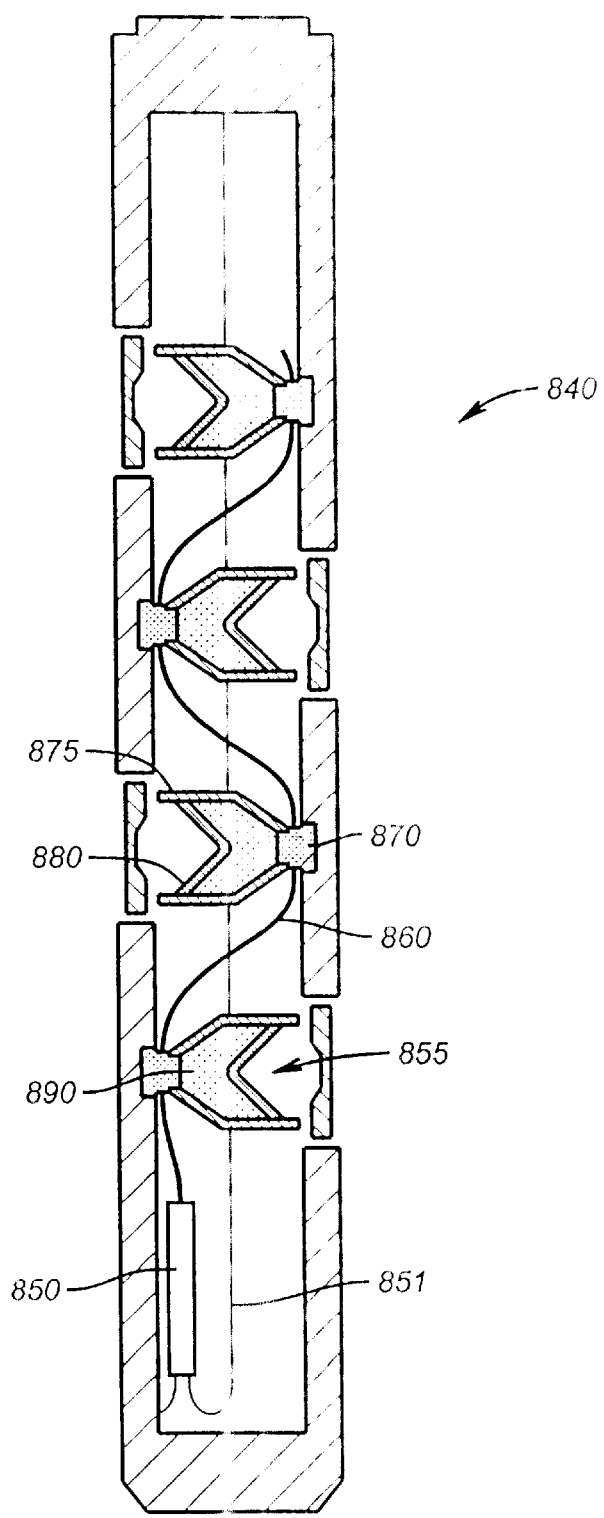
FIG. 8B is a cut-away view of a downhole perforating gun.
Figure 9:
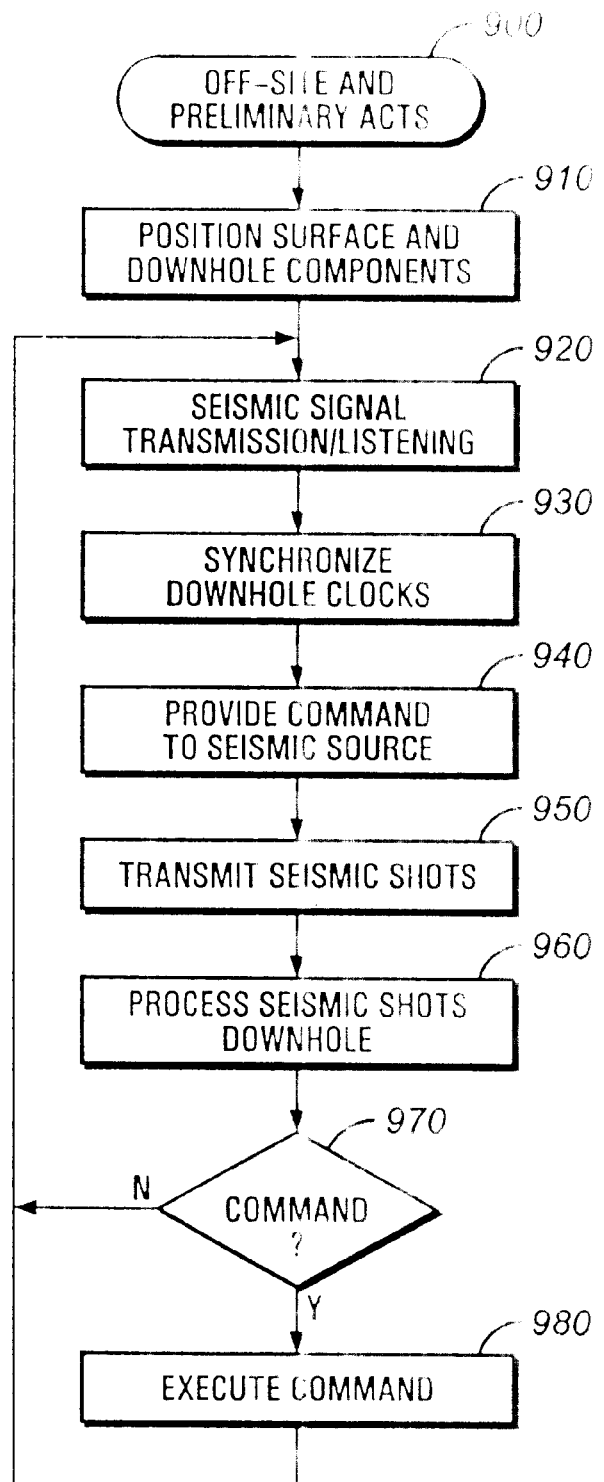
FIG. 9 is a flowchart of a preferred method of seismic that results in actuation of the controlled device and performance of the action.

The preferred actuatable device 840 is a perforating gun, such as shown in FIG. 8B. A perforating gun 840 includes a detonator 850 attached to a number of shaped charges 855 via a detonating cord 860. Each shaped charge 855 includes a primer explosive charge 870, a case 875 filled with main explosive charge 890 and covered with liner 880. The liner is conical or parabolical and is made of an alloy of drawn copper or a pressed mixture of copper, lead and other metallic powders. The case is usually metal. The primer and main explosives are selected according to the application, such as RDX or HMX for typical applications or HNS or PYX for high-temperature applications. Upon activation of the detonator 850 by an electrical current passing through the wire 851, the detonation cord 860 begins to explode. The explosion in the detonating cord 860 ignites the primer explosive charge 870. A detonation wave then travels through the main explosive charge 890 at 25,000 ft/sec to 30,000 ft/sec, generating intense forces on the liner sides on the order of two to four million psi. These intense forces collapse the liner, forming a jet of particulated liner material. The jet is propelled outwardly along the charge axis of the cone at a very high velocity. This jet penetrates a casing in the borehole, and the rock surrounding rock formation forming a series of holes.

Rather than use an electrically activated perforating gun, the seismic shots may utilize the fluid pressure present in the borehole itself to trigger activation. In particular, information transmitted by seismic shots may instruct a downhole processor or the like to activate a valve inside the perforating gun. This activation of the valve allows highly pressured borehole fluid to flow into a chamber within the perforating gun. Forming a wall of this chamber is the head of a piston. In response to the increased pressure in the chamber from the borehole fluid, the piston is forced from an unactuated to an actuated position. This causes the opposite end of the piston to strike against a detonator that begins gun function. Because this design requires a high fluid pressure for activation, it is relatively safe at the surface, where this high fluid borehole pressure is not present. But regardless, seismic signaling of this and other types of perforating guns (as well as other types of downhole tools) is within the scope of the invention.

It should be understood that the invention is not limited to the exact structure disclosed in FIGS. 4–8. Electrical and mechanical elements and sensors may be added to the system as desired, and many of the components of the preferred embodiment may be integrated with other components or eliminated. The computing (and data storage) functions of the signal processor 340, the process controller 350 and the controlled device 150 or any combination thereof may be combined if so desired by providing one computer and programming it to perform all of the required functions. For example, CPU 710 and DRAM 720 may be one and the same as CPU 520 and DRAM 530. Conversely, redundant components may be provided to guard against system failure.

The components of the system are preferably utilized according to the method next described and illustrated in FIGS. 9–14. This method shares certain features with that disclosed in U.S. Pat. No. 6,002,640, hereby incorporated by reference for all purposes.

At step 900, off-site and other preliminary acts are taken to prepare for the hydrocarbon-retrieval project. This includes the design and selection of project plans and project menus, as well synchronizing clocks above ground, loading menus into the appropriate CPU's, and other preparatory acts. Step 900 also includes selection of the design for the seismic receiver/process controller 140 and the repeatable seismic source system 110. This ensures adequate signal-to-noise ratios for the received seismic signals. Reasonable prior testing and experience will provide a guide in this selection.

The project plan selects the appropriate controllable device to be placed in the borehole, and determines the appropriate depth. The list of possible commands from the surface to the controllable device will be included in the plan, as well as the specific sequence of seismic signals that indicate each particular command. A Gantt chart may be prepared to enable an estimate of project duration and other aspects of the operation that will help determine battery power requirements of the downhole elements.

As part of the project plan development, project menus will also be designed. These project menus are designed to be appropriate for the project requirements and devices to be controlled. The menu is invoked by generating a series of nearly identical seismic shots ("SISS") from the site 100 according to the timing protocol contained in the menu.

At step 910, the surface and downhole elements are positioned. Step 910 also includes any necessary manipulation of a locking arm attached to the downhole components, as explained above. The repeatable seismic source may optionally be located underground, such as in an adjacent borehole to the controllable device.

At step 920, the seismic signal transmission/listening phase begins. During this phase, the downhole seismic receivers are placed into a "listen" mode by the CPU 520 to detect seismic signals. The "listen" mode entails providing power to the seismic receiver 330 and processing (e.g. storing and analyzing) any received seismic signal. Also during step 920, the seismic sources are placed into a "signal generation" mode during which these sources are capable of transmitting on short notice a series of nearly identical seismic signals ("SISS") to communicate with components deep in the borehole. This SISS also includes periods during which no seismic shot is generated as explained in more detail below. In addition, the SISS may be utilized to synchronize the subsurface clock or clocks contained in the downhole seismic receiver/process controller 140. The seismic sources may generate seismic signals for other purposes as well, e.g., well seismic profiling.

At step 930, the downhole clock is synchronized by use of seismic signals. If a sufficiently accurate clock can be provided in the downhole assembly this re-synchronization may not be required. However, certain applications, especially those requiring extended duration and complex signaling, may depend on this ability to maintain timing accuracy. As will be appreciated after understanding the teachings herein, any of the SISS shots (after the calibration shot) may be used to calibrate or synchronize the downhole clock (assuming its clock drift does not exceed the defined maximum clock drift). Thus, the timing of step 930 is not step specific.

At step 940, a decision is made by a surface operator to transmit instruction or commands to the downhole devices, and the instruction or command is provided to the system controller 120. The system controller 120 translates the command to seismic shot instructions and transmits them to the processor 230 associated with the seismic source.

At step 950, the seismic source transmits a series of seismic shots in accordance with the pre-programmed menu structure from the fixed-site 100 to the downhole seismic receiver/process controller 140. These seismic shots are a timed series of nearly identical seismic signals. Thus, at step 950 the seismic source processor excites the seismic source to transmit an initial calibration shot followed by a command sequence. The processor 230 also performs signal processing, quality assurance, etc. of the seismic shots.

During step 960, each seismic shot of the command sequence (plus a calibration shot) is processed by the downhole process controller 140. Thus, during step 960, CPU 520 determines if a command sequence has been received. At step 970, it is determined whether a command has been received by the downhole CPU 520.

If a command has been received by downhole process controller 140, during step 980 the CPU 710 executes the command, such as transmitting an actuation signal to the controllable device 150. If controllable device is a perforating gun, for example, the actuation signal may be delivered directly to the detonator of the perforating gun. In the case of a downhole perforating gun, this step includes the detonation of explosive charges in the perforating gun. These detonations perforate the casing wall and rock surrounding the borehole to allow hydrocarbon retrieval from the surrounding rock formation.

The system then returns to step 920 for appropriate seismic signal transmission and listening.

The preferred system has particular advantages when used with a perforating gun. It is known that the effective velocity of detonation in a perforating gun is about 10 feet/msec. Thus, about 20 msec are required for the detonation wave to travel through a 200 foot perforating gun. Because the detonation creates a seismic response that will travel to the surface 105 and be detected by seismic receivers 115, it is possible by proper listening at step 920 or other appropriate time (and throughout the process if desired) for the surface controller to be immediately aware whether a substantial portion of the explosives on the perforating gun detonated. Of course, as signal analysis improves, and as more surface receivers are added, it will be possible to detect the percent of gun assembly that has fired with greater precision. This ability to immediately detect with an installed system the proper or improper performance of a perforating gun is believed highly desirable, especially in deep wellbores with permanent completion. Alternately, for other downhole devices, a seismic signal generator may be in the borehole with the device to transmit seismic signals to the surface and enable two-way interaction between the surface components and the device in the borehole.

As indicated above, a series of nearly identical seismic shots ("SISS") are used to communicate from the surface to a downhole device. A particular SISS is initiated only at start-of-programmed-time-window time (defined in the program menu) plus integral multiples of the parameter ZPTW (programmed time window interval), also contained in the menu. Within each SISS, shots may be initiated only at integral multiples of the unit time step. These basic rules preferably bound the timing of every seismic shot and enable the method of signaling.

Figure 10A:
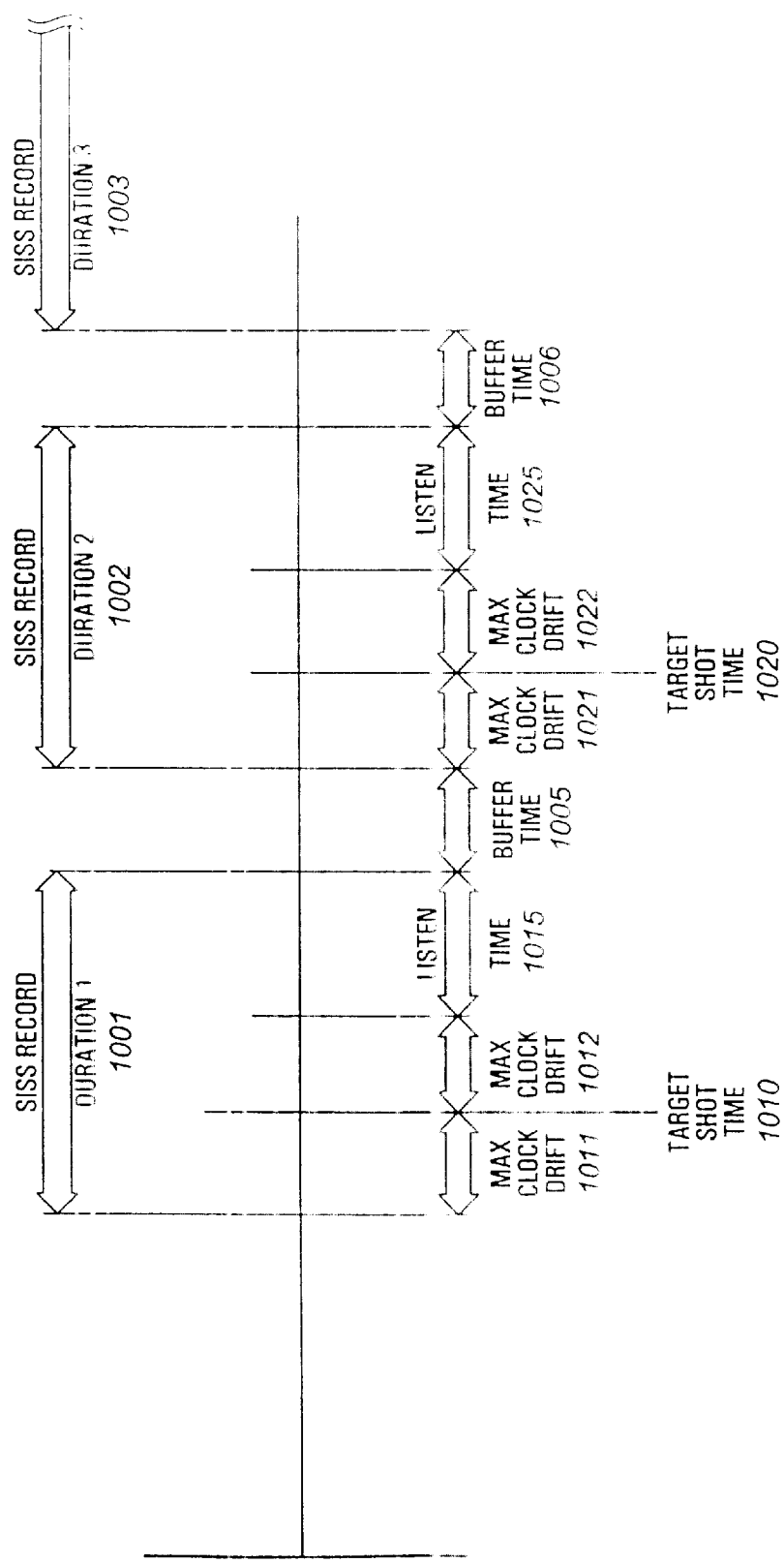
FIGS. 10A and 10B are time lines for the seismic shot sequences.

A series of nearly identical seismic shots may be timed according to the timeline of FIG. 10A (not to scale). Shown are SISS Record Durations 1001, 1002, 1003, with interspersed buffer times 1005, 1006. Each SISS Record Duration includes a target shot time 1010, 1020 (sandwiched between two maximum clock drift periods 1011, 1012 and 1021, 1022, respectively), and a listen time 1015, 1025. This arrangement provides an efficient mechanism to transmit a binary sequence downhole. If a seismic shot is detected by a downhole receiver at a particular target shot time, that shot time corresponds to a "1" transmitted downhole. If no shot is received at a particular target shot time, that target shot time is identified as a "0". A buffer time between each SISS Duration allows reflective seismic impulses, for example, to attenuate and fade. Of course, any uphole seismic sensors 115 may also listen throughout the buffer time if there is information of interest during this time. For example, if a command to detonate a downhole perforating gun is transmitted by acoustic signal, the uphole seismic sensors may listen for a sufficiently long period thereafter to detect what portion of the explosives in the perforating gun have detonated. The communication protocol of FIG. 10A is especially reliable and resistant to noise or miscommunication.

Figure 10B:
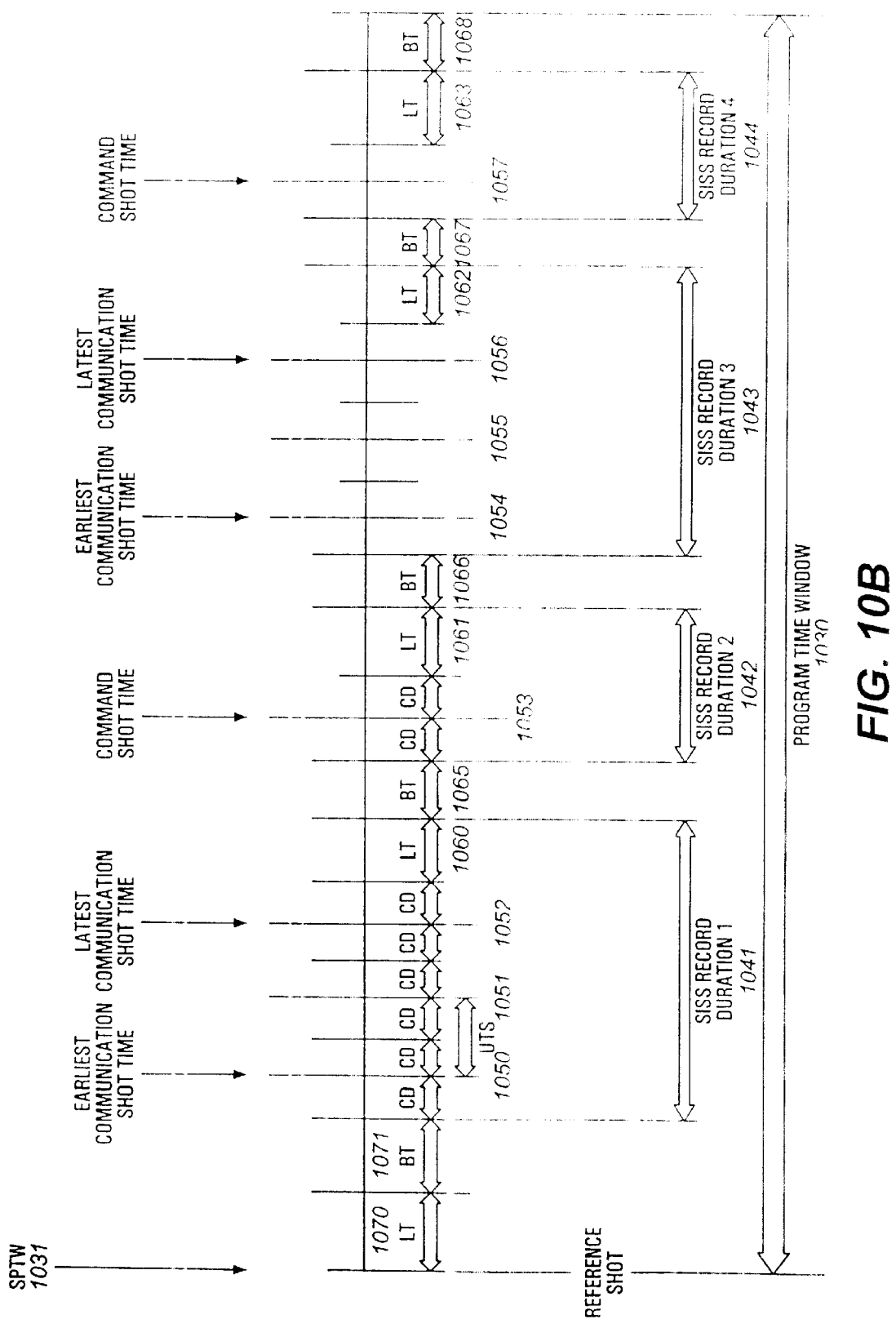

Other communication protocols may also be employed. FIG. 10B (not to scale) illustrates a communication protocol that transmits information downhole at a faster data rate than that shown in FIG. 10A. It includes a Program Time Window (PTW) 1030 with a Start of Program Time Window (SPTW) 1031, communication shot target times 1050–1052, 1054–1056, and command shot target times 1053, 1057. Each Shot Time 1050–1057 is sandwiched between two maximum clock drift periods (CD). The shot times are also followed by a listen times 1060–1063 and a buffer time 1065–1068. Also identified in FIG. 10B is the Unit time step (UTS) equal to the minimum spacing between two communication shots. Also shown are listen time 1070 and buffer time 1071, which precede SISS Record Duration 1041.

The information carrying seismic shots of FIG. 10B have been labeled as either communication shots or as command shots. As can be seen, each communication shot may be timed to arrive at one of numerous target shot times. Each target shot time corresponds to different transmitted data. Conversely, each command shot is timed to arrive at only a single target shot time, ensuring either a "1" or a "0" based upon the presence or absence of a shot. In this way, information that can be put at risk of error (such as the K-gain for the downhole amplifier) may be transmitted downhole as a communication shot, improving the data transmission bandwidth for this data. Information that must receive the highest reliability (such as a detonate command) can be transmitted using a series of command shots.

Figure 15:
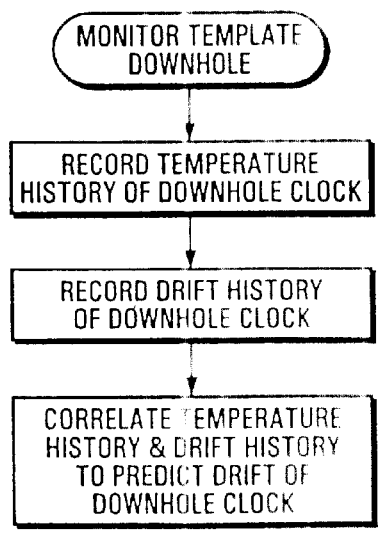
FIG. 15 is a flow chart to predict future clock drift based on temperature.

It can also be appreciated that each transmitted communication/command shot may be used to correct for clock drift as generally explained herein and in U.S. Pat. No. 6,002,640. Furthermore, by creating a record of temperature history and a record of clock drift history, the two may be correlated and used to predict future variations in clock drift (as shown in FIG. 15).

Figure 11:
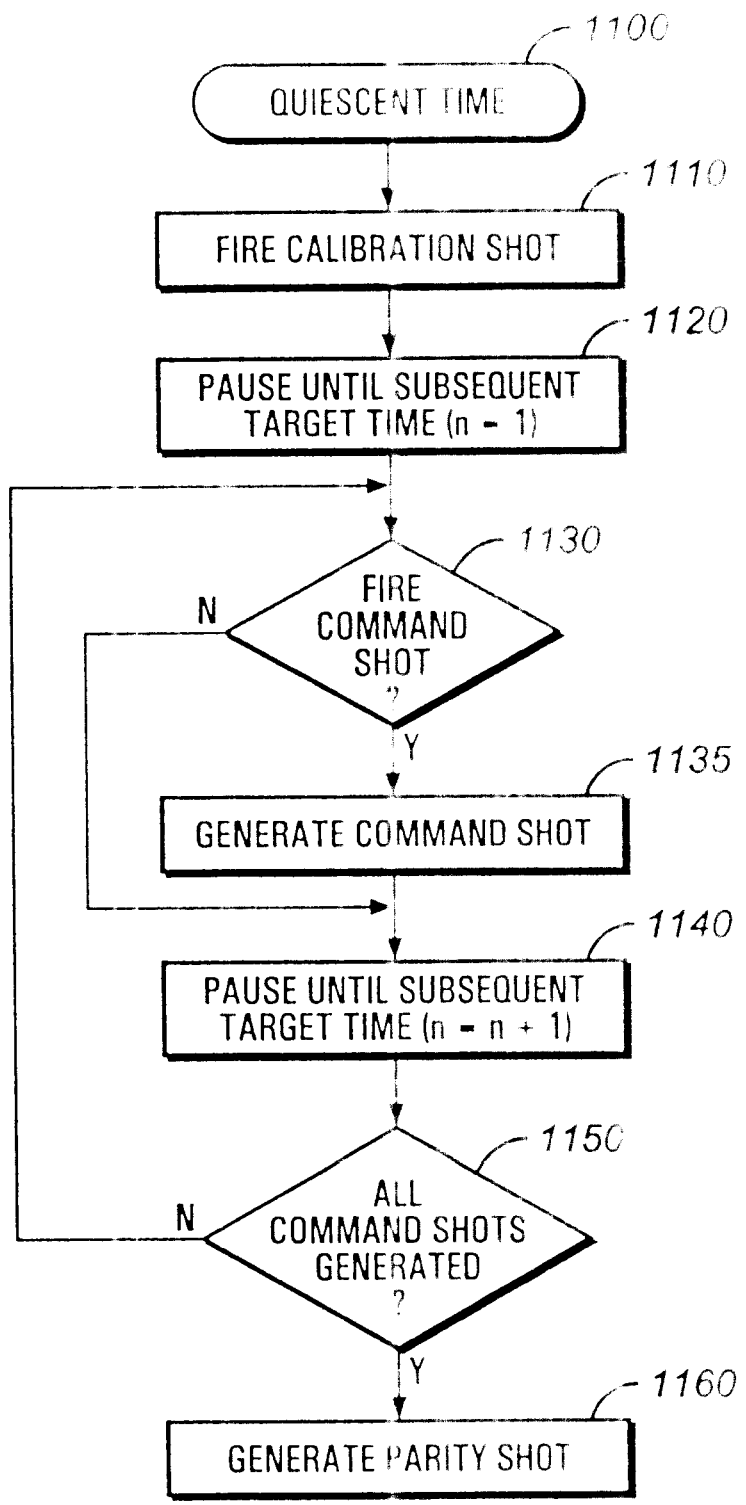
FIG. 11 is a flow chart of a preferred method for the communication of a command sequence at the surface.

FIG. 11 provides a preferred series of steps for seismic signaling of a controllable downhole device. At step 1100, a quiescent period occurs during which no SISS shot occurs. After this time, the CPU 520 of the downhole seismic receiver/process controller 140 listens for a first shot of an SISS, as described with respect to FIG. 12.

Referring back to FIG. 11, at step 1110 in response to a command or a pre-programmed signal, the surface seismic source array 110 generates or fires the first seismic signal in the SISS. This first seismic signal is called the reference shot or calibration shot and is the timing reference for the remainder of the SISS shots in the command sequence. It is used as a timing reference for additional SISS shots if so desired, and may be used to synchronize the downhole clock.

At step 1120, the surface seismic source pauses until the next seismic shot target time. Careful timing of the seismic shots is important for a number of reasons. First, adequate spacing of the seismic shots helps reduce interference and improves the signal-to-noise ratio of the seismic signal. Second, the timing of an SISS affects the interpretation of the command, as explained below, and a mistimed shot corrupts the command sequence. Third, the downhole process controller 140 can use the SISS shots as a mechanism to compensate for the clock drift of its internal clock (i.e. synchronize its clock).

Step 1130 is the decision whether to fire a command shot at the target time that corresponds to a communication bit "n" of the command sequence. At the time of a first potential command shot, n=1. In the preferred embodiment, a binary communication protocol is employed with a firing of a seismic shot at the shot target time communicating a "1" to a device downhole. The absence of a seismic shot at the shot target time communicates a "0" to the downhole device. Thus, the decision at step 1130 equates to whether the first bit of the command sequence is equal to "1" or "0".

If the first bit of the command sequence is a "1", then at step 1135 a seismic shot is generated at the surface. If the first bit of the command sequence is a "0" then the method proceeds directly to step 1140 without generating a surface seismic signal.

At step 1140, the surface seismic source once again pauses until the next seismic shot target time.

At step 1150, the CPU references the applicable menu to determine whether all the command shots necessary for the command sequence have been generated by the surface seismic sources. For example, each command sequence for the applicable program menu may include 16 bits of information. If there remain command shots to be generated at the surface, the method returns to step 1140 and determines whether a "1" or a "0" is to be next transmitted downhole. If, according to a preprogrammed set of menus, all the command shots have been fired, then the surface seismic source fires a parity shot or shots at step 1160.

The parity shot (or shots) is a quality assurance mechanism that specifies how many seismic communication/command shots were fired at the surface (e.g. how many "1" bits exist in the command sequence transmitted downhole). For example, if eight seismic shots were generated during the command sequence, the parity shot would have a value of eight. The exact protocol chosen to communicate the parity value "eight" downhole is left to the operator. A time window with at least eight target times would suffice, as would a series of four parity shots communicating eight in binary (i.e. 1000). Other variants to communicate the parity value downhole are also within the skill of the artisan. If additional communication/command shots are to be transmitted downhole, the process is repeated.

Figure 12A:
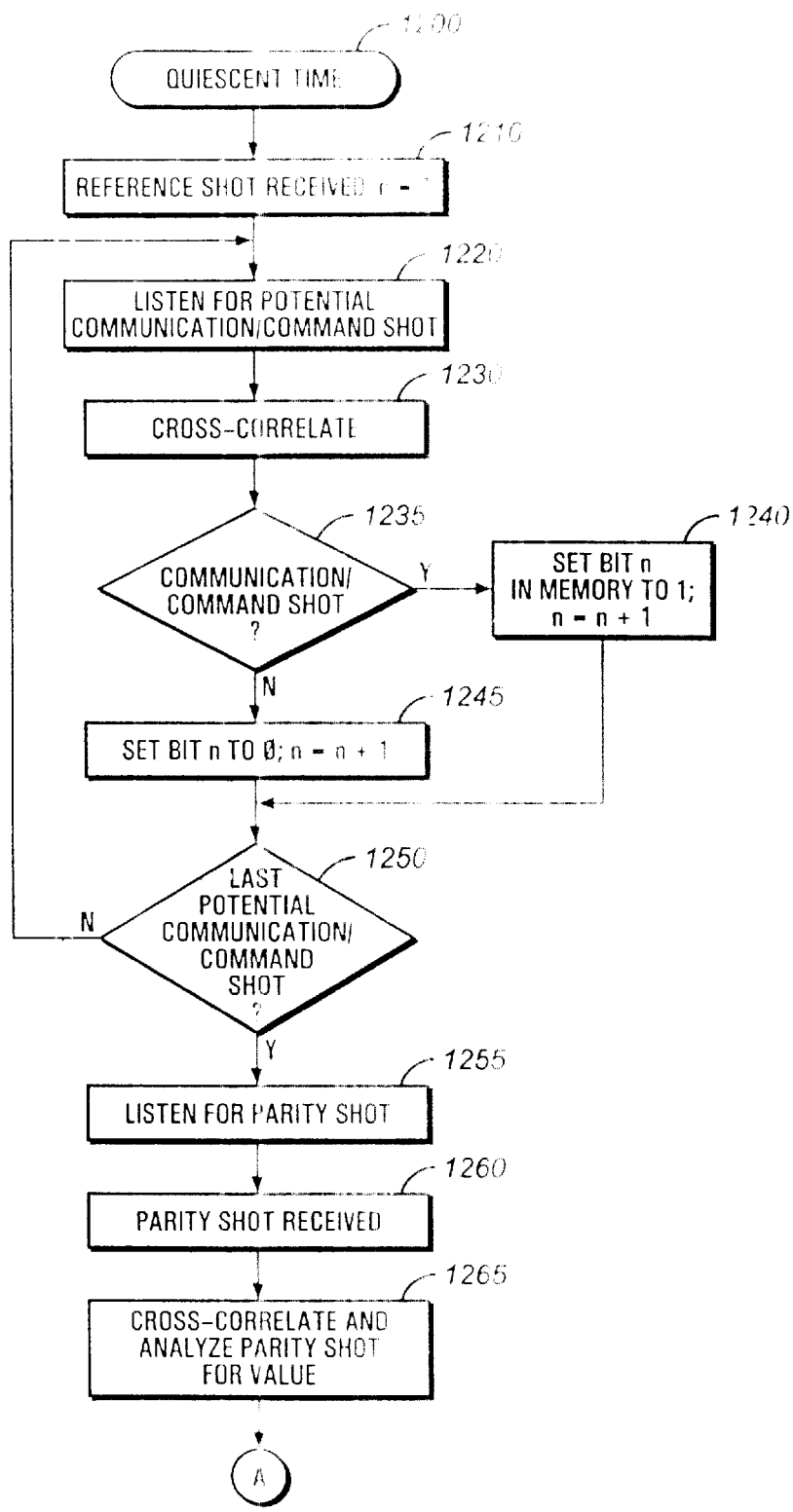
FIGS. 12A and 12B are a flow chart of a preferred method for the communication of a command sequence deep in the wellbore.
Figure 12B:
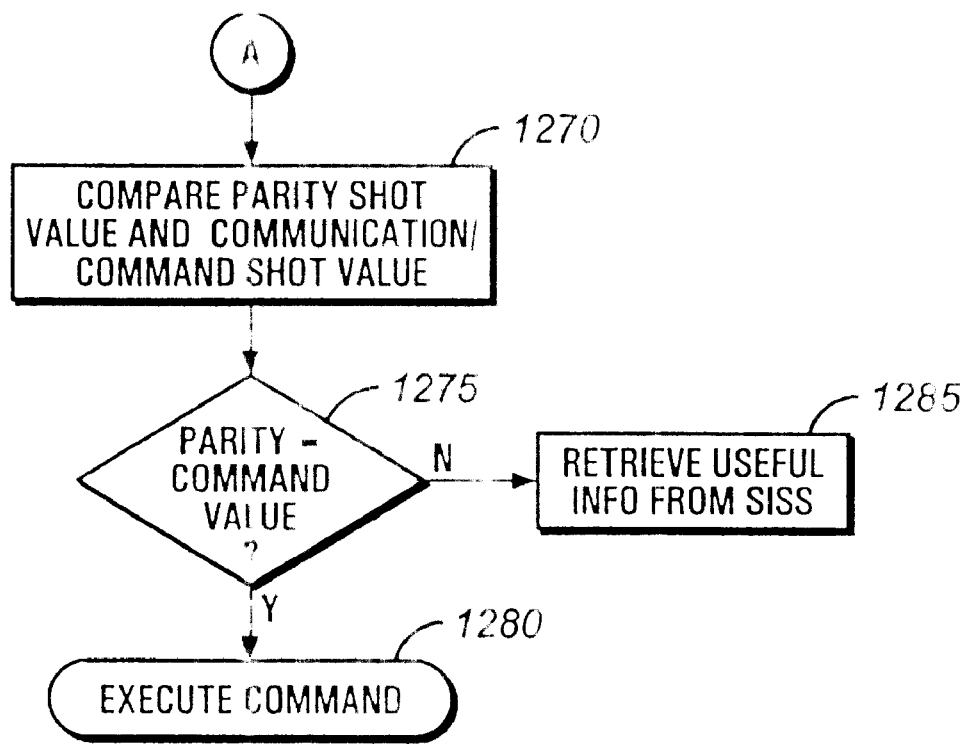

FIGS. 12A and 12B provide a series of steps for the downhole process controller or controllers 140. The signal processor 340 of the process controller 140 has the capability to determine very accurately the time of arrival of each shot. Therefore it can use the same menu possessed by the system controller 120 to interpret the signal that was transmitted by the seismic source 110.

At step 1200, a quiescent period occurs during which no SISS shot occurs. As soon as the seismic receiver 330 is placed in its final position and its optional locking arm system 336 activated, the downhole elements of the system can begin to operate. Just prior to the next scheduled programmed time window (PTW) for source emissions, the signal processor 340 activates the digitizing and recording functions to store digitized values of the sensor outputs in its memory. Thus, at this time, the CPU of the downhole seismic receiver/process controller 140 listens for a first shot of an SISS.

At step 1210, the downhole seismic sensors detect a calibration or reference shot. This reference shot is the correlating reference for the subsequent communication/command shot and defines the first target time as shown in FIGS. 10A and 10B.

At step 1220, the process controller 140 listens for a next seismic shot. In particular, the CPU of the process controller 140 records detected seismic activity over a SISS Record Duration time window that includes the target shot time, as illustrated in FIGS. 10A and B. Because this window may or may not be occupied by seismic activity indicative of a seismic shot from the surface (depending, e.g., on whether a "1" or a "0" is being transmitted downhole), the CPU is said to be listening for a "potential communication shot."

At step 1230, the CPU of the process controller cross-correlates the calibration shot to the potential communication/command shot to determine if a seismic communication/command shot was detected by the seismic sensors. The cross-correlation process provides a powerful mathematical means of determining the presence or absence of a subsequent shot after the reference or timing shot; and if the subsequent shot exists, the peak time of the cross-correlation can be measured and interpreted to yield the value of the time elapsed between the initiation of the two shots. Other mathematical formulations which allow comparison of two time series can be used in lieu of the cross-correlation method to accomplish the same purpose. As used herein, the term cross-correlation is used to represent the entirety of this class of mathematical methods. Specifics of a preferred technique of cross correlation are explained with respect to FIG. 13.

If at step 1235 a communication/command shot was received then at step 1240 the CPU sets a bit in memory as having received a communication/command shot. In this instance, bit 1 (the first bit of the command sequence, n=1) in the DRAM of the process controller is set to a value of 1. If at step 1245 a communication/command shot was not received, bit 1 in the DRAM of the process controller is set to or kept at a value of 0. The bit count is then advanced by one (n=n+1).

At step 1250 it is determined from the project menus whether the last potential communication/command shot of the command sequence has been received. If not, then the method listens for the next potential communication/command shot for bit 2 (n=2) at step 1220. If the last communication shot of the command sequence has been received, then listening begins for the parity shot at step 1255.

At step 1260, the parity shot is received. At step 1265, the parity shot is cross-correlated with a previous SISS shot, either the reference shot, a later shot, or some combination of earlier shots, and the value transmitted downhole by the parity shot is determined. As explained above, the exact methodology to determine the value of the parity shot is user and operation specific and may be chosen according to the desires of the user.

At step 1270, the parity shot value is compared to the value corresponding to the transmitted communication/command shot. Typically, the parity value will be equal to the number of command shots received. Following this protocol, if at step 1275 the parity value equals the number of command shots received, or the parity shot otherwise confirms the proper transmission of communication shots, the command or commands contained in the command sequence are executed by the CPU and the controllable device 150 at step 1280. If at step 1275 the parity value does not equal the number of command shots received (or reflects some other error in transmission), there has been an error in transmission and the command or commands are not executed by the CPU. Nonetheless, depending on safety and the desires of the operators there may nonetheless be useful information in the command sequence that can be derived at step 1285. For example, in Table 4, the parity check fails because only 18 shots were detected excluding the parity shot and the parity shot indicates 19 such shots were fired. In this example, one of the eight shots which by the protocol of the menu are required to be either all present or all absent is in disagreement with the other seven. Useful information readily believable from this "failed" communication includes the project menu identification (PM2), the K Gain setting (42 db), and the ARM command. Furthermore, it is very probable that the DETONATE command was intended to be communicated as 7 out of 8 shots were detected. Thus, all or nearly all of the information intended can be derived from the communication.

If more than one process controller 140 is downhole, an additional quality check includes comparison among the two or more process controllers of the binary sequence corresponding to the received command. If both process controllers recorded the same binary sequence from the surface, the probabilities that the received command is accurate are enhanced. These methods of comparing received waveforms are known to, and are within the skill of, one of ordinary skill in the art.

Figure 13:
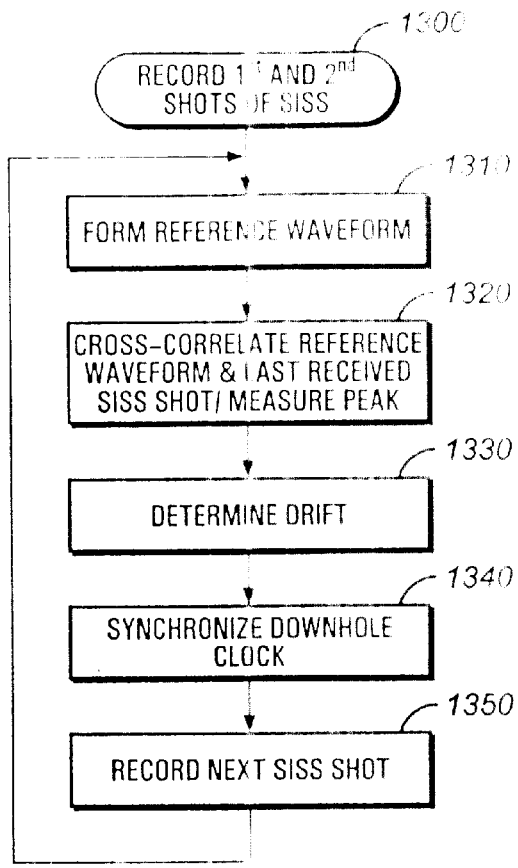
FIG. 13 is a flow chart of correlating received seismic waveforms.

Referring to FIG. 13, a technique of cross correlation includes comparing two recorded seismic shots and deriving a degree of fit between them. If a high degree of fit is present, the later recorded seismic shot can be reliably considered detected. The time of arrival can also be reliably measured for each shot of the SISS. These times of arrival that can be employed to synchronize the downhole clock to the master clock.

At step 1300, first and second shots of an SISS are recorded. The time segment from the start of the SISS Record Duration to the end of the SISS Record Duration for each shot is the time window of interest for cross-correlation purposes. Thus, at step 1310, the first reference waveform is established (which in this case is the reference shot).

At step 1320, the reference wave form and the last received SISS shot are cross-correlated. In particular, normalized correlations can be formed by computing the zero-lag amplitudes of the auto-correlations of the two time functions being compared and dividing the cross-correlation amplitudes by the square root of the product of these two zero-lag amplitudes.

A threshold value or "correlation coefficient" can be set or established that, if exceeded by the peak amplitude of the normalized cross-correlation, indicates that a communication/command shot was received. The threshold value can be adaptively set based on observed signal-to-noise ratios, or may be preset at the surface prior to deployment downhole. An example of a pre-set correlation coefficient threshold is a value of 0.70. If this value is exceeded it is extremely likely that a shot was in fact initiated. Absolute identity of the two functions would yield a correlation a coefficient of unity.

Figure 14A:
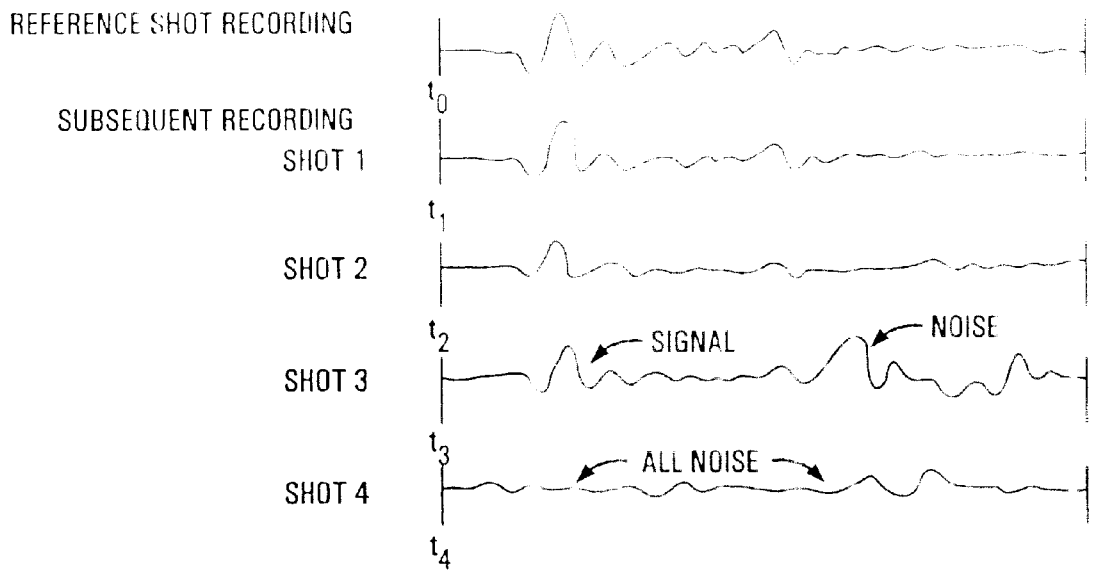
FIGS. 14A and 14B illustrate the comparison of received seismic waveforms.
Figure 14B:
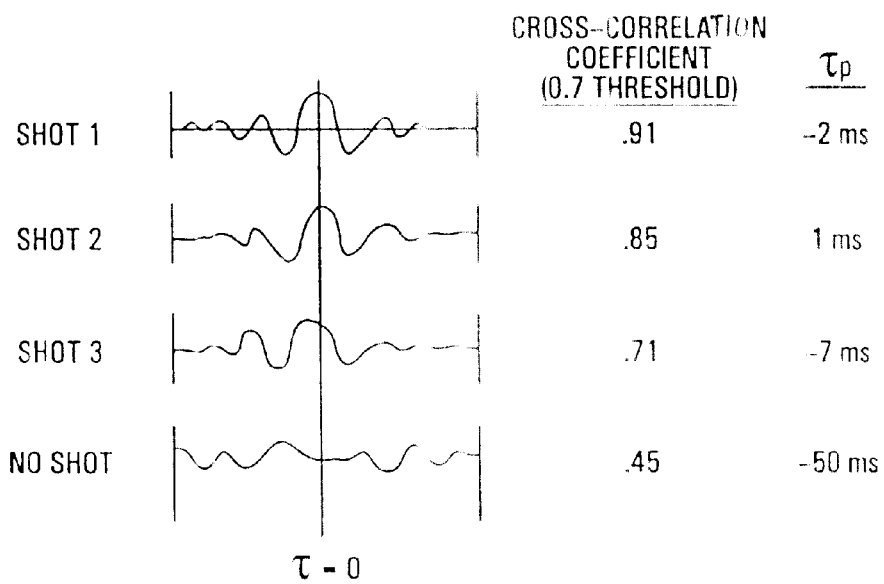

FIG. 14 illustrates one application of the cross-correlation method. However, numerous processing techniques are known in the field of signal processing to determine whether a signal has been received and each of these is available to one of ordinary skill for this invention. In FIG. 14, there are shown a reference shot recording followed by four recorded time windows that the menu dictates to be potential communication shots. In the example shown three of the four cross-correlations have positive peak amplitudes which exceed the threshold value which was set for the identification of a shot (0.70). The fourth correlation does not have any amplitude which exceeds the threshold and therefore it is deemed that no shot occurred. In practice a correlation coefficient threshold of 0.70 would ensure a high likelihood that "no-shot" instances would not be improperly identified as shots. In this manner correlation coefficients can be used for each pair of (potential) shots being compared and used to appraise the quality of the results. Other similar quality criteria thresholds can be established to aid in the decision making regarding actions to take as a result of the seismic communication.

Referring back to FIG. 13, at step 1330, the drift between the SISS shot of interest and the reference waveform is established. If there has been detectable clock drift, the downhole clock may be synchronized at step 1340. At step 1350, the next SISS shot is recorded and the process is repeated. However, because there is by now a recorded history of SISS shots, two or more SISS shots may be averaged or otherwise combined to form an improved reference waveform.

The method of FIGS. 13 and 14 assumes a near-exact repetition from the same site 100 of the seismic source wavelet 160. If this can be achieved, variation in the resultant cross-correlations from a correlation coefficient of unity may then be ascribed to ambient or system noise. Thus, significant unintended variation in the seismic source wavelet or significant movement of the seismic sources may compromise the integrity of the communication.

Where SISS shots are used to communicate commands or information to the downhole components, the values corresponding to one or a series of command/communication shots are translated into commands and information according to a set of Menus programmed in the CPU's (both surface and downhole), such as shown in Tables 1–8. Each menu comprises a table of shot time values versus message information enabling each CPU to translate times of seismic shots and the presence/absence of shots into usable information. For a particular CPU, a general menu is established which defines the most general case for the capabilities of that CPU or controllable device. Each general menu is composed of many variables, including a unique identifier. Standard defaults may be provided for certain variables. If there is not a general default for a variable, it may be determined solely by the SISS, and thus the general menu can be used directly (as can any menu).

For a given project, a single project menu is defined which includes all of the parameters of the applicable general menu and adds all of the project-specific parameters that apply. The project menu also establishes any variable that will not vary throughout the project or production schedule by means of setting default values. The project menu further defines project ranges and valid values for other variables. The project menu may further be divided into a number of subsets called "set menus." Each set menu further defines other variables, and thus reduces the number of parameters that can be changed. Examples of parameters are recording schedule, the target shot times, and the maximum clock drift. Other parameters in a menu include constant gain setting, sample period, record length, record interval, and filter settings. Yet another parameter could be an indication of previous source drift. An SISS may also convey the identification of the next applicable Set Menu and recording or "listen" start and end times.

Some parameters are not explicitly stored in the Menus, but rather are algorithmically computed from the shot interval times and/or number of shots in the SISS. As many set menus as required will be programmed for a particular project. A benefit of defining the lower level Menus is to limit the number of shots in the SISS, to reduce the amount of time and effort to complete the SISS, and to minimize the chances of error during communication.

The SISS can be used to enable a more specific menu, such as a set menu, and thereby set additional default values. The SISS can also be used to enable a more general menu. In addition, the SISS can instruct a portion only of the process controller 140 to sleep or ignore subsequent commands, or to change menus, for example.

The communication/command shots, in combination with the reference shot, may also be used to synchronize the internal downhole clock 510 with the master clock in the system controller 120. Such re-synchronization is limited to correcting only that part of the clock drift which occurred following the reception of the first shot after the downhole elements are in place. Nonetheless, the ability to synchronize the remote downhole clock is particularly useful because of the extreme conditions present downhole that deteriorate clock performance, such as elevated pressures and temperatures. Less expensive clocks also tend to drift to a greater degree than their more expensive brethren, and the ability to re-synchronize may allow the selection of a less-expensive clock in system design.

Examples of project menus are shown in Tables 1 and 5. Examples of application of the project menu from Table 1 are shown in Tables 2, 3 and 4. Examples of the application of project menu of Table 5 is shown in Table 6, 7 and 8.

Each menu includes parameters which are held constant for the particular project and variable parameters. The variable parameters may include control settings for any elements of the downhole system such as the seismic receiver, the power supply or for the actuatable device. The actuation commands for the actuatable device are the second class of variable parameters and as such are of primary importance.

In Table 1, an example of project menu is shown in which a series of parameters that are held constant throughout the project are first shown, followed by a timing reference shot and by four parameters, each controlled by a shot, that may be varied. The reference shot provides a means of re-synchronizing the internal clock of the downhole system with the master clock on the surface.

The four variable parameters are those that are to be conveyed by seismic communication from the surface. In this example, they are (1) the menu identification of the menu to be used in the next PTW; (2) a K gain or preamplifier gain setting for the seismic receiver; (3) an arm/disarm switch for the controllable device which, in this case, is a perforating gun; and (4) a detonate command for the perforating gun.

The final shot shown in the menu in Table 1 is to convey a parity parameter. In this case the parity parameter is set equal to the number of previous seismic shots in this particular occurrence of the menu application. The parity parameter can enable the process controller 350 to verify that the received message is internally consistent and thus provide powerful quality assurance to the method.

Referring to Table 1, the columns entitled "Earliest Shot Time" and Latest Shot Time" show the earliest and latest times at which a particular shot may be taken. The particular time within this range at which the shot is actually taken is chosen such that an explicit value of the parameter is indicated. For example, the parameter K will have one of four possible values. If the first value is chosen the shot will be initiated at the start time of the PTW plus 41.800 sec; if the second value is chosen the shot will be initiated at one UTS later, i.e. 42.000 sec; if the third value is chosen the shot will be initiated two UTS later at 42.200 sec; and if the fourth possible value is chosen the shot will be at 42.400 sec.

This is shown in Tables 2–4 for three different communications using the same project menu design from Table 1 and is discussed later in this section.

Variations to this method may be made and still be within the scope of the teachings herein. For example, as disclosed above, the first shot of the SISS (after activation of the downhole elements) provides a reference used in detecting and measuring the arrival time of subsequent shots of the SISS. The time segment from the start of the recording to the end of the listen time for the first shot is this reference function and is used to cross-correlate or otherwise process all subsequent recording of the first SISS.

The reference function chosen for subsequent SISS may also be an alternative reference function formed from a combination of prior SISS recordings, or it may be taken directly from a subsequent SISS recording. The purpose in combining prior recordings to form a new reference function is to improve the signal-to-noise ratio in the reference. Summing or diversity stacking prior recordings with appropriate time shifts is a convenient method of forming an improved reference function. Care must be taken to correctly measure and account for any clock drift in the signal processor prior to summing.

The signal processor stores the seismic recordings from the earliest possible time of arrival of seismic waves from the earliest possible shot in the SISS until a pre-determined listen time (LT) after the last possible time for a shot to be initiated in the SISS, but may omit buffer times.

Tables 2–4 show examples of the usage of shot presence/absence determination and correlation peak times and correlation coefficients in interpreting the intended message.

In Table 2 a specific case of applying the menu in Table 1 is depicted. The human operator has decided to communicate the parameter settings shown in the two leftmost columns to the process controller. He wishes to designate Project Menu 1 for the next PTW, to set K Gain at 36 dB, to arm the detonator, but not to detonate at this time.

These choices are translated into times of eleven seismic shots which form the SISS. The times of these shots (relative to the start time of the PTW) are shown in the column labeled "Corresponding Shot Time". They range from 0.000 sec for the first shot to 384.400 sec for the parity shot.

The cross-correlation method previously described may be used to determine the presence or absence of each possible shot. If the correlating coefficient exceeds 0.70, the shot is deemed to have been taken. The results are shown in the column entitled "Shot?" with values of 1 for "shot" and 0 for "no shot". Further use of the calculated cross-correlations is made to determine the measured time of initiation relative to the start time of the PTW of each identified shot. These times are shown in the column labeled "Observed Raw Times." If no shot was identified at the time of a potential shot "NG" is indicated in the column.

The signal processor finds the nearest time in the menu model for a possible shot and compares it to the observed raw times. An average difference between observed and model times is calculated and applied as a correction to the observed times. This yield the results labeled "Corrected Times."

The differences between model times and corrected times are shown in the column entitled "Delta to Model Times." The standard deviation or other measure of the scatter of these difference values may be used as another quality assurance criterion. If a preset threshold is exceeded the message could be rejected or marked as suspect in quality.

The parameter values are determined from the corrected times and shown in the column entitled "Settings Calculation." This determination is made by the signal processor using the menu which it was given during project initialization at the surface. A simple matchup of values with the determined shot times via the ordinal count is the method used. This is just the reverse of the process used to determine the shot times from the desired parameter values.

In this model the arm command is conveyed by a series of eight shots at predetermined times. In the example in Table 2 all eight shots occurred and were correctly identified. Thus the interpretation is shown to "ARM THE DETONATOR". Similarly a subsequent eight shots are used to convey the command to "DETONATE". In this example these eight shots were absent and properly identified as absent. Thus the interpretation is "DO NOT DETONATE".

Multiple shots are used to convey these vitally important messages to ensure that a potentially hazardous action is not taken unintentionally through an error in communication. Probability of an error can be reduced to an arbitrarily low level by increasing the number of shots used to convey the command. However this correspondingly increases the likelihood of an inability to signal the command due to noise interference. In this method any errors in communication are most likely to cause a safe outcome.

Repeated signaling of the same commands can be used to overcome a failure to communicate due to temporary noise interference. This is done by performing an identical SISS at a subsequent PTW. The signal processor can be programmed to combine the recordings using signal enhancement technology well known in the seismic industry or they may be simply processed independently and results compared.

In the example in Table 2 all shots were correctly timed and identified within the limits specified and therefore all of the information in the intended message was correctly conveyed. The signal processor, having processed the seismic data, invoked the menu to decode the message, then passed the message and quality assurance information to the process controller. The process controller evaluates this and decides any actions to take. In this case it would command the controlled device 150 to "ARM THE DETONATOR". It would also set the K Gain to 36 dB (in the seismic receiver) and inform the signal processor to use Project Menu 1 for the next PTW. Thus the process controller not only controls the actions of the controllable device, it also controls the operation of the entire seismic receiver/process controller system.

Continuing the specific examples of seismic communication using the project menu of Table 1 (Table 2 was the first example), Table 3 shows a subsequent SISS. In Table 3 shots are taken to indicate to "DETONATE". A condition for this command to be valid is for the detonator to be armed so the shots which indicate to arm the detonator are also taken. This provides in effect 16 shots which have to be correctly identified as shots for the detonate command to take place. Thus it is extremely unlikely that a false detonate command could be interpreted, even in very poor signal-to-noise ratio conditions.

Again, as in the example of Table 2, the standard deviation of Delta to Model Times is sufficiently small (at 4.16 msec) and the observed correlation coefficients exceed the threshold of 0.7. The parity shot signals 19 shots, the same number as the number of shots identified excluding the parity shot. Thus the parity checks correctly and all of the quality assurance indicators signify a successful message transmission.

When the interpreted message and quality assurance information is passed by the signal processor to the process controller, the process controller would command the controllable device, i.e. perforation gun system, to detonate.

Depending on the design of the combined downhole equipment the resultant explosion could damage and render inoperative the seismic receiver/process controller system 140. This may be acceptable since it has fulfilled its mission.

The final example of application of the project menu of Table 1 is shown in Table 4. In this example a failure of seismic communication is depicted.

As in the example of Table 3, it is desired to send the message to detonate. However in the new example, one of the seven shots was not correctly identified as a shot due to a high amplitude burst of ambient noise. The signal processor presumes the absence of the required shot because of the low value of the correlation coefficient, 0.412. It also notes that the parity value communicated differs by one from the number of shots it actually detected. It passes these results to the process controller which decides what, if any, action to take. In strict adherence to safety standards it does not issue a detonate command.

On the surface the human operator does not detect a subsurface explosion occurred (monitored via seismic monitor sensor array 115 by the system controller computer 280 or other means) and decides to continue sending the identical message at subsequent PTWs until an explosion occurs. Assuming better noise conditions, this will happen after the next SISS is received. If not, other recourse is to quiet the noise or increase the signal strength, possibly by adding a source unit. If these measures and further such measures fail the ultimate recourse is to remove the downhole equipment having failed to cause a detonation of the perforating gun, try to explode it by backup means, or to abandon it. This type of failure is expected to be very rare due to the robustness of the seismic communication technology described herein.

Tables 5–8 provide a second series of examples of seismic communication from the surface to the deep borehole. The project menu is shown in Table 5. It differs in design from the previous example in that communication of binary numbers by a series of shots/no shots (1/0) is utilized. The menu has been set up to control the valve rate settings (from 0 to 100% open) for four different valves in the deep borehole.

As in the previous example, the first shot is the timing reference shot. Following this is a shot which communicates which project menu is to be used for the next PTW. Next is a shot which communicates which of the four valves is referenced for the value flow rate setting which follows. The valve flow rate is given by a series of eight "potential shots." If the shot is taken, a value of 1 for the bit in question is ascribed. If no shot is taken at the specified time, a value of 0 is ascribed to that bit.

Thus, a value ranging from 0 to 255 may be communicated. A value of 0% open corresponds to 0, and 100% open corresponds to 255, with linear proration between these end points.

The VFR (valve Flow Rate setting) is signaled redundantly within the project menu for purposes of quality assurance. The two valve settings must be interpreted identically for the command to meet quality standards.

The final shot is, as in the first example, the parity shot, providing another quality assurance check. The number of shots detected must equal the interpreted value of the parity shot for the quality standard to be met.

Table 6 gives the first example of the application of the project menu of Table 5. In this example, the value #3 is commanded to be set to 90% open. The ordinal values for the chosen values of the next project menu and the valve ID are converted to times and shots initiated at these times (relative to the start time of the PTW).

The "90% open" selection is equivalent to decimal 230 and binary 11100110. Thus, in order, three potential shots are taken, two shots are skipped, two more shots are taken, and the eighth shot is skipped, all at the times prescribed by the project menu.

This sequence is then repeated identically for the redundancy quality check.

There are thirteen prior shots in the SISS, so the parity shot is timed to indicate the value 13.

The signal processor 340 determines the values listed in the columns entitled "Observed Raw Times" and "Observed Correlation Coefficients." All shots that were taken yielded correlation coefficients greater than the established threshold of 0.7, and are therefore correctly identified as being shots. All potential shots that were not fired yielded correlation coefficients less than 0.7. They are, thus, correctly identified as "no-shots."

The signal processor 340 compares the observed times to the nearest allowable times in the menu and computes the time differences. These are shown in the column entitled "Delta to Model Times." The average of these differences yields one measure of clock drift. In this case, the downhole clock 510 is measured to be 3.0 msec fast (relative to the Master Clock in the surface controller 120). This s conclusion assumes a reference shot is used from a prior SISS and the drift measured is that which occurred after the reference shot was recorded.

The observed times are synchronized to the Master Clock using this measurement and the differences to Model Times is recomputed. The corrected times are shown in the second column entitled "Delta to Model Times" and their standard deviation is computed. At 5.45 msec, this value is deemed to be within quality assurance thresholds.

Ordinal values are then calculated from the "nearest-to" model times and values of the next project menu and the current valve identification are determined from these ordinals. The binary representation of the value setting is constructed from the shot/no-shot indications and this value is computed to be equivalent to "90% open." As the parity check agrees, and all other quality criteria are met by the data, the communication and command to open valve #3 to 90% open is accepted by the Process controller 350.

Table 7 shows a similar example to that of Table 6, varying in that a different valve setting is commanded.

Table 8 shows an example similar to that of Table 6 except that an error in communication occurs. Due to presence of a noise burst or a weak shot, the correlation coefficient of the second shot of the valve flow rate setting series falls below the threshold of 0.7. Thus, the process controller does not identify this shot as a shot, and puts a zero in the setting where a 1 was intended. The parity shot does not yield an identical number to the number of identified shots and, therefore, this quality check fails. Furthermore, the two repetitions of the valve setting disagree (65% and 90%) which also fails the quality check.

This process controller can reject the communication entirely or it may invoke special logic with which it may be programmed to take an "intelligent" decision on what to do next. The process controller may, of course, listen at the next scheduled PTW for the next SISS, which may clarify the message.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. For example, the seismic source 100 and/or monitoring seismic receivers 115 may be placed below ground, such as in a second borehole. This may be useful in a network of wells. Accordingly, the scope of protection is not limited to the embodiments described herein, but is only limited by the claims that follow, the scope of which shall include all equivalents of the subject matter of the claims.

TABLE 1

PROJECT MENU EXAMPLE

| Parameter Name | Symbol | Source | General Default | Project Fixed Parameters Allowed Values | Units |
|---|---|---|---|---|---|
| Project Name | PN | Project File | Project Unidentified | up to 64 characters | alphanumeric |
| SISS Unit Time Step | UTS | Project File | 0.200 | 0.005 to 0.500 in steps of 0.005 | seconds |
| Listen Time | LT | Project File | 12.000 | 0.500 to 25.000 in steps of 0.500 | seconds |
| Buffer Time | BT | Project File | 8.000 | 0.500 to 25.000 in steps of 0.500 | seconds |
| PTW Interval | ZPTW | Project File | 15 minutes | 5 to 60 minutes | minutes |
| Start Time of First PTW | SPTW | Project File | | | |
| Sweep Length | RL | Project File | 9.000 | 0.5 to 36.0 Seconds | seconds |
| Sample Period | SP | Project File | 2 milliseconds | .50, 1, 2, 3, 4, 6 | milliseconds |
| NDAU Model Number | | General Menu | 1.2 HX Model 2 | 16 characters | alphanumeric |
| NSR Software Version | | Software | Version 2.0 | 16 characters | alphanumeric |
| Client Identification | | Project File | Client Unidentified | 64 characters | alphanumeric |
| Contractor Identification | | Project File | Contractor ID | 64 characters | alphanumeric |
| Receiver Types | RT | Project File | Receivers Unidentified | 64 characters | alphanumeric |
| Source Types | | Project File | Source Unidentified | 16 characters | alphanumeric |
| Auto Edit Shots On/Off | AEF | Project File | Perform Autoedit | 0 to 1 | none |
| Minimum Correlation Coeff. | MINCC | Project File | 0.7 | | |
| Gain Mode for SISS DP | GM | Project File | Constant Gain | 16 characters | alphanumeric |
| Back Up Mode | BUM | Project File | e all parameters from | 32 characters | alphanumeric |
| Other General Parameters | | | As defined | | |

| Parameter Name | Symbol | Source | General Default | Variable Communicated Parameters Allowed Values | Units | Maximum Ordinal Count | Cum. Max. Ordinal Count | Earliest Shot Time | Latest Shot Time |
|---|---|---|---|---|---|---|---|---|---|
| Reference Shot | RSHOT | SISS Shot 0 | No Default Allowed | | alphanumeric | 1 | 1 | 0.000 | 0.000 |
| Menu ID for Next PTW | PMID | SISS Shot 1 | PM1 | up to 10 menus | | 10 | 11 | 20.000 | 21.800 |
| K Gain | K | SISS Shot 2 | 30 decibels | 24, 30, 36, 42 | decibels | 4 | 15 | 41.800 | 42.400 |
| Arm/Disarm Switch | ARMSW | SISS Shot 3–10 | DISARM | ARM or DISARM | binary switch | 1 | 16 | 62.400 | 62.400 |
| | | | | | | 1 | 17 | 82.400 | 82.400 |
| | | | | | | 1 | 18 | 102.400 | 102.400 |
| | | | | | | 1 | 19 | 122.400 | 122.400 |
| | | | | | | 1 | 20 | 142.400 | 142.400 |
| | | | | | | 1 | 21 | 162.400 | 162.400 |
| | | | | | | 1 | 22 | 182.400 | 182.400 |
| | | | | | | 1 | 23 | 202.400 | 202.400 |
| Detonate Command | DETCOM | SISS Shot 11–18 | Not Activated | DETONATE or NOT-DETONATE | binary switch | 1 | 24 | 222.400 | 222.400 |
| | | | | | | 1 | 25 | 242.400 | 242.400 |
| | | | | | | 1 | 26 | 262.400 | 262.400 |
| | | | | | | 1 | 27 | 282.400 | 282.400 |
| | | | | | | 1 | 28 | 302.400 | 302.400 |
| | | | | | | 1 | 29 | 322.400 | 322.400 |
| | | | | | | 1 | 30 | 342.400 | 342.400 |
| | | | | | | 1 | 31 | 362.400 | 362.400 |
| Parity | PAR | SISS Shot 19 | No default is available | # of shots(−1) in this PTW(3, 11 or 19) | Ordinal integer | 19 | 50 | 382.400 | 386.000 |
| SISS Record Duration | RD | Computed for each case | | 398.000 | Seconds | | | | |

TABLE 2

FIRST EXAMPLE OF APPLICATION OF PROJECT MENU FROM TABLE 1

Settings

Example Project 1
Unit Time Step is 200 msec
LT is 12 seconds
BT is 8 seconds
PTW Interval is 15 minutes
Next PTW at 8:00:00 AM
SL is 9 seconds
SP is 2 msec
MINCC = 0.70

These parameters are not transmitted.

Example of Message Transmission

| Setting | Interpretation | Chosen Ordinal | Corresponding Shot Time | Observed Corr. Coeff. | Shot? | Weighted Corr. Coeff. | Observed Raw Times | Nearest Time in Model |
|---|---|---|---|---|---|---|---|---|
|  | Synchronization check | 1 | 0.000 | 0.850 | 1 | 0.85 | 0.002 | 0.000 |
| PM 1 | Project Menu 1 | 2 | 20.200 | 0.821 | 1 | 0.821 | 20.206 | 20.200 |
| 36 decibels | K Gain is 36 db | 3 | 42.200 | 0.789 | 1 | 0.789 | 42.197 | 42.200 |
| ARM | ARM THE DETONATOR | 1 | 62.400 | 0.796 | 1 | 0.796 | 62.405 | 62.400 |
|  | (all live shots) | 1 | 82.400 | 0.912 | 1 | 0.912 | 82.400 | 82.400 |
|  |  | 1 | 102.400 | 0.896 | 1 | 0.896 | 102.409 | 102.400 |
|  |  | 1 | 122.400 | 0.855 | 1 | 0.855 | 122.399 | 122.400 |
|  |  | 1 | 142.400 | 0.789 | 1 | 0.789 | 142.404 | 142.400 |
|  |  | 1 | 162.400 | 0.912 | 1 | 0.912 | 162.410 | 162.400 |
|  |  | 1 | 182.400 | 0.715 | 1 | 0.715 | 182.395 | 182.400 |
|  |  | 1 | 202.400 | 0.912 | 1 | 0.912 | 202.403 | 202.400 |
| DO NOT DETONATE | DO NOT DETONATE | 1 | 222.400 | 0.210 | 0 | 0 | NG | NG |
|  | (all no shots) | 1 | 242.400 | 0.121 | 0 | 0 | NG | NG |
|  |  | 1 | 262.400 | 0.098 | 0 | 0 | NG | NG |
|  |  | 1 | 282.400 | 0.320 | 0 | 0 | NG | NG |
|  |  | 1 | 302.400 | 0.410 | 0 | 0 | NG | NG |
|  |  | 1 | 322.400 | 0.021 | 0 | 0 | NG | NG |
|  |  | 1 | 342.400 | 0.119 | 0 | 0 | NG | NG |
|  |  | 1 | 362.400 | 0.085 | 0 | 0 | NG | NG |
| PARITY | 11 shots not incl this shot | 11 | 384.400 | 0.924 | 1 | 0.924 | 384.406 | 384.400 |
|  |  |  |  |  | 12 Shots Found | 0.8476 Average Corr. Coeff. |  |  |

These parameters are known by default by the Process Controller

Settings

Example Project 1
Unit Time Step is 200 msec
LT is 12 seconds
BT is 8 seconds
PTW Interval is 15 minutes
Next PTW at 8:00:00 AM
SL is 9 seconds
SP is 2 msec Example of Reception and Decoding of Message

| Delta to Model Times | Corrected Times | Delta to Model Times | Ordinal Calculation | Settings Calculation | Interpreted Settings |
|---|---|---|---|---|---|
| 0.002 | −0.001 | −0.001 | 1 | NA | NA |
| 0.006 | 20.203 | 0.003 | 2 | PM2 | Project Menu 1 |
| −0.003 | 42.194 | −0.006 | 3 | 36 decibels | K Gain is 36 db |
| 0.005 | 62.402 | 0.002 | 1 | shot | ARM THE DETONATOR |
| 0.000 | 82.397 | −0.003 | 1 | shot |  |
| 0.009 | 102.406 | 0.006 | 1 | shot |  |
| −0.001 | 122.398 | −0.004 | 1 | shot |  |
| 0.004 | 142.401 | 0.001 | 1 | shot |  |
| 0.010 | 162.407 | 0.007 | 1 | shot |  |
| −0.005 | 182.392 | −0.008 | 1 | shot |  |
| 0.003 | 202.400 | 0.000 | 1 | shot |  |
| NA | NA | NA | #VALUE! | no shot | DO NOT DETONATE |
| NA | NA | NA | #VALUE! | no shot |  |
| NA | NA | NA | #VALUE! | no shot |  |
| NA | NA | NA | #VALUE! | no shot |  |
| NA | NA | NA | #VALUE! | no shot |  |
| NA | NA | NA | #VALUE! | no shot |  |
| NA | NA | NA | #VALUE! | no shot |  |
| NA | NA | NA | #VALUE! | no shot |  |

TABLE 2-continued

FIRST EXAMPLE OF APPLICATION OF PROJECT MENU FROM TABLE 1

| | | | | | |
|---|---|---|---|---|---|
| 0.006 | 384.403 | 0.003 | 11 | Parity | Parity Checks OK |
| 0.003 | | 0.004734784 | | | Std. Deviation is OK |
| Avg Delta 3.0 msec | | 4.73 msec | 11 | | Avg. Corr. Coeff. is .85 |
| DAU Time Drift Est. | | Std. Deviation is OK | Parity Checks OK | | Shots are consistent |
| Clock is 3.0 msec fast | | | | | Quality Standards Met |

TABLE 3

SECOND EXAMPLE OF APPLICATION OF PROJECT MENU FROM TABLE 1

Settings

Example Project 1  
Unit Time Step is 200 msec  
LT is 12 seconds  
BT is 8 seconds  
PTW Interval is 15 minutes  
Next PTW at 8:00:00 AM  
SL is 9 seconds  
SP is 2 msec  
MINCC = 0.70

These parameters are not transmitted.

Example of Message Transmission

| Setting | Interpretation | Chosen Ordinal | Corresponding Shot Time | Observed Corr. Coeff. | Shot? | Weighted Corr. Coeff. | Observed Raw Times | Nearest Time in Model |
|---|---|---|---|---|---|---|---|---|
| | | 1 | 0.000 | 0.850 | 1 | 0.85 | −0.002 | 0.000 |
| PM 1 | Project Menu 1 | 2 | 20.200 | 0.821 | 1 | 0.821 | 20.204 | 20.200 |
| 42 decibels | K Gain is 42 db | 4 | 42.400 | 0.789 | 1 | 0.789 | 42.395 | 42.400 |
| ARM | ARM THE DETONATOR | 1 | 62.400 | 0.796 | 1 | 0.796 | 62.403 | 62.400 |
| | (all live shots) | 1 | 82.400 | 0.912 | 1 | 0.912 | 82.395 | 82.400 |
| | | 1 | 102.400 | 0.896 | 1 | 0.896 | 102.405 | 102.400 |
| | | 1 | 122.400 | 0.855 | 1 | 0.855 | 122.399 | 122.400 |
| | | 1 | 142.400 | 0.789 | 1 | 0.789 | 142.396 | 142.400 |
| | | 1 | 162.400 | 0.912 | 1 | 0.912 | 162.396 | 162.400 |
| | | 1 | 182.400 | 0.715 | 1 | 0.715 | 182.403 | 182.400 |
| | | 1 | 202.400 | 0.912 | 1 | 0.912 | 202.392 | 202.400 |
| DETONATE | DETONATE | 1 | 222.400 | 0.844 | 1 | 0.844 | 222.401 | 222.400 |
| | (all live shots) | 1 | 242.400 | 0.852 | 1 | 0.852 | 242.398 | 242.400 |
| | | 1 | 262.400 | 0.952 | 1 | 0.952 | 262.399 | 262.400 |
| | | 1 | 282.400 | 0.917 | 1 | 0.917 | 282.391 | 282.400 |
| | | 1 | 302.400 | 0.895 | 1 | 0.895 | 302.405 | 302.400 |
| | | 1 | 322.400 | 0.888 | 1 | 0.888 | 322.401 | 322.400 |
| | | 1 | 342.400 | 0.864 | 1 | 0.864 | 342.396 | 342.400 |
| | | 1 | 362.400 | 0.953 | 1 | 0.953 | 362.402 | 362.400 |
| PARITY | 19 shots not incl. this shot | 19 | 386.000 | 0.924 | 1 | 0.924 | 385.997 | 386.000 |
| | | | | | 20 Shots Found | 0.8668 Average Corr. Coeff. | | |

These parameters are known by default by the Process Controller

Settings

Example Project 1  
Unit Time Step is 200 msec  
LT is 12 seconds  
BT is 8 seconds  
PTW Interval is 15 minutes  
Next PTW at 8:00:00 AM  
SL is 9 seconds  
SP is 2 msec

Example of Reception and Decoding of Message

| Delta to Model Times | Corrected Times | Delta to Model Times | Ordinal Calculation | Settings Calculation | Interpreted Settings |
|---|---|---|---|---|---|
| −0.002 | −0.001 | −0.001 | 1 | NA | |
| 0.004 | 20.205 | 0.005 | 2 | PM2 | Project Menu 1 |
| −0.005 | 42.398 | −0.004 | 4 | 42 decibels | K Gain is 42 db |
| 0.003 | 62.404 | 0.004 | 1 | shot | ARM THE DETONATOR |
| −0.005 | 82.398 | −0.004 | 1 | shot | |
| 0.005 | 102.408 | 0.005 | 1 | shot | |
| −0.001 | 122.400 | 0.000 | 1 | shot | |
| −0.004 | 142.397 | −0.003 | 1 | shot | |

TABLE 3-continued

SECOND EXAMPLE OF APPLICATION OF PROJECT MENU FROM TABLE 1

| | | | | | |
|---|---|---|---|---|---|
| −0.002 | 162.399 | −0.001 | 1 | shot | |
| 0.003 | 182.404 | 0.004 | 1 | shot | |
| −0.008 | 202.393 | −0.007 | 1 | shot | |
| 0.001 | 222.402 | 0.002 | 1 | shot | DETONATE |
| −0.002 | 242.399 | −0.001 | 1 | shot | |
| −0.001 | 262.400 | 0.000 | 1 | shot | |
| −0.009 | 282.392 | −0.008 | 1 | shot | |
| 0.005 | 302.406 | 0.006 | 1 | shot | |
| 0.001 | 322.402 | 0.002 | 1 | shot | |
| −0.004 | 342.397 | −0.003 | 1 | shot | |
| 0.002 | 362.403 | 0.003 | 1 | shot | |
| −0.003 | 385.998 | −0.002 | 19 | Parity | Parity Checks OK |
| −0.001 | | 0.004163332 | | | Std. Deviation is OK |
| Avg Delta −1.0 msec | | 4.16 msec | 19 | | Avg. Corr. Coeff. is .87 |
| DAU Time Drift Est. | | Std. Deviation is OK | Parity Checks OK | | Shots are consistent |
| Clock is 1.0 msec slow | | | | | Quality Standards Met |

TABLE 4

THIRD EXAMPLE OF APPLICATION OF PROJECT MENU FROM TABLE 1

Settings

Example Project 1  
Unit Time Step is 200 msec  
LT is 12 seconds  
BT is 8 seconds  
PTW Interval is 15 minutes  
Next PTW at 8:00:00 AM  
SL is 9 seconds  
SP is 2 msec  
MINCC = 0.70

These parameters are not transmitted.

Example of Message Transmission

| Setting | Interpretation | Chosen Ordinal | Corresponding Shot Time | Observed Corr. Coeff. | Shot? | Weighted Corr. Coeff. | Observed Raw Times | Nearest Time in Model |
|---|---|---|---|---|---|---|---|---|
| | | 1 | 0.000 | 0.850 | 1 | 0.85 | −0.002 | 0.000 |
| PM 1 | Project Menu 1 | 2 | 20.200 | 0.821 | 1 | 0.821 | 20.204 | 20.200 |
| 42 decibels | K Gain is 42 db | 4 | 42.400 | 0.789 | 1 | 0.789 | 42.395 | 42.400 |
| ARM | ARM THE DETONATOR | 1 | 62.400 | 0.796 | 1 | 0.796 | 62.403 | 62.400 |
| | (all live shots) | 1 | 82.400 | 0.912 | 1 | 0.912 | 82.395 | 82.400 |
| | | 1 | 102.400 | 0.896 | 1 | 0.896 | 102.405 | 102.400 |
| | | 1 | 122.400 | 0.855 | 1 | 0.855 | 122.399 | 122.400 |
| | | 1 | 142.400 | 0.789 | 1 | 0.789 | 142.396 | 142.400 |
| | | 1 | 162.400 | 0.912 | 1 | 0.912 | 162.396 | 162.400 |
| | | 1 | 182.400 | 0.715 | 1 | 0.715 | 182.403 | 182.400 |
| | | 1 | 202.400 | 0.912 | 1 | 0.912 | 202.392 | 202.400 |
| DETONATE | DETONATE | 1 | 222.400 | 0.844 | 1 | 0.844 | 222.401 | 222.400 |
| | (all live shots) | 1 | 242.400 | 0.852 | 1 | 0.852 | 242.398 | 242.400 |
| | | 1 | 262.400 | 0.952 | 1 | 0.952 | 262.399 | 262.400 |
| | | 1 | 282.400 | 0.917 | 1 | 0.917 | 282.391 | 282.400 |
| | | 1 | 302.400 | 0.895 | 1 | 0.895 | 302.405 | 302.400 |
| | | 1 | 322.400 | 0.412 | 0 | 0 | NG | NA |
| | | 1 | 342.400 | 0.864 | 1 | 0.884 | 342.396 | 342.400 |
| | | 1 | 362.400 | 0.953 | 1 | 0.953 | 362.402 | 362.400 |
| PARITY | 19 shots not incl. this shot | 19 | 386.000 | 0.924 | 1 | 0.924 | 385.997 | 386.000 |
| | | | | | 19 Shots Found | 0.8857 Average Corr. Coeff. | | |

TABLE 4-continued

THIRD EXAMPLE OF APPLICATION OF PROJECT MENU FROM TABLE 1

|  |  |  |  |  | Settings |
|---|---|---|---|---|---|
|  |  |  | These parameters are known by default by the Process Controller |  | Example Project 1<br>Unit Time Step is 200 msec<br>LT is 12 seconds<br>BT is 8 seconds<br>PTW Interval is 15 minutes<br>Next PTW at 8:00:00 AM<br>SL is 9 seconds<br>SP is 2 msec |

Example of Reception and Decoding of Message

| Delta to Model Times | Corrected Times | Delta to Model Times | Ordinal Calculation | Settings Calculation | Interpreted Settings |
|---|---|---|---|---|---|
| −0.002 | −0.001 | −0.001 | 1 | NA |  |
| 0.004 | 20.205 | 0.005 | 2 | PM2 | Project Menu 1 |
| −0.005 | 42.396 | −0.004 | 4 | 42 decibels | K Gain is 42 db |
| 0.003 | 62.404 | 0.004 | 1 | shot | ARM THE DETONATOR |
| −0.005 | 82.396 | −0.004 | 1 | shot |  |
| 0.005 | 102.406 | 0.006 | 1 | shot |  |
| −0.001 | 122.400 | 0.000 | 1 | shot |  |
| −0.004 | 142.397 | −0.003 | 1 | shot |  |
| −0.002 | 162.399 | −0.001 | 1 | shot |  |
| 0.003 | 182.404 | 0.004 | 1 | shot |  |
| −0.008 | 202.393 | −0.007 | 1 | shot |  |
| 0.001 | 222.402 | 0.002 | 1 | shot | DO NOT DETONATE |
| −0.002 | 242.399 | −0.001 | 1 | shot | did not detect one required |
| −0.001 | 262.400 | 0.000 | 1 | shot | shot and parity not OK |
| −0.009 | 282.392 | −0.008 | 1 | shot |  |
| 0.005 | 302.406 | 0.008 | 1 | shot |  |
| NA | NA | NA | #VALUE! | no shot detected |  |
| −0.004 | 342.397 | −0.003 | 1 | shot |  |
| 0.002 | 362.403 | 0.003 | 1 | shot |  |
| −0.003 | 385.998 | −0.002 | 18 | Parity | Parity NOT OK |
| −0.001 |  | 0.00415771 |  |  | Std. Deviation is OK |
| Avg Delta −1.0 msec |  | 4.15 msec | 19 |  | One shot does not agree |
| DAU Time Drift Est. |  | Std. Deviation is OK | Parity checks fails |  | Avg. Corr. Coeff. is .87 |
| Clock is 1.0 msec slow |  |  |  |  | Quality Standards Not Met |

TABLE 5
PROJECT MENU EXAMPLE DEMONSTRATING VALVE CONTROL

| Parameter Name | Symbol | Source | General Default | Project Fixed Parameters Allowed Values | Units |
|---|---|---|---|---|---|
| Project Name | PN | Project File | Project Unidentified | up to 64 characters | alphanumeric |
| SISS Unit Time Step | UTS | Project File | 0.200 | 0.005 to 0.500 in steps of 0.005 | seconds |
| Listen Time | LT | Project File | 12.000 | 0.500 to 25.000 in steps of 0.500 | seconds |
| Buffer Time | BT | Project File | 8.000 | 0.500 to 25.000 in steps of 0.500 | seconds |
| PTW Interval | ZPTW | Project File | 15 minutes | 5 to 60 minutes | minutes |
| Start Time of First PTW | SPTW | Project File | | | seconds |
| Sweep Length | RL | Project File | 9.000 | 0.5 to 36.0 Seconds | seconds |
| Sample Period | SP | Project File | 2 milliseconds | .50, 1, 2, 3, 4, 6 | milliseconds |
| NDAU Model Number | | General Menu | 1.2 HX Model 2 | 16 characters | alphanumeric |
| NSR Software Version | | Software | Version 2.0 | 16 characters | alphanumeric |
| Client Identification | | Project File | Client Unidentified | 64 characters | alphanumeric |
| Contractor Identification | | Project File | Contractor ID | 64 characters | alphanumeric |
| Receiver Types | RT | Project File | Receivers Unidentified | 64 characters | alphanumeric |
| Source Types | | Project File | Source Unidentified | 64 characters | alphanumeric |
| Auto Edit Shots On/Off | AEF | Project File | Perform Autoedit | 0 to 1 | none |
| Minimum Correlation Coeff. | MINCC | Project File | 0.7 | | |
| Gain Mode for SISS DP | GM | Project File | Constant Gain | 16 characters | alphanumeric |
| Back Up Mode | BUM | Project File | General Default | 32 characters | alphanumeric |
| Other General Parameters | | Project File | As defined | | |

| Parameter Name | Symbol | Source | General Default | Variable Communicated Parameters Allowed Values | Units | Maximum Ordinal Count | Cum. Max. Ordinal Count | Earliest Shot Time | Latest Shot Time |
|---|---|---|---|---|---|---|---|---|---|
| Reference Shot | RSHOT | SISS Shot 0 | No Default Allowed | | alphanumeric | 1 | 1 | 0.000 | 0.000 |
| Menu ID for Next PTW | PMID | SISS Shot 1 | PM1 | up to 10 menus | alphanumeric | 10 | 11 | 20.000 | 21.800 |
| Valve Identification | VID | SISS Shot 2 | Valve 1 | 1, 2, 3, or 4 | binary | 4 | 15 | 41.800 | 42.400 |
| Valve Flow Rate Setting | VFR | SISS Shot 3–10 | Valved Closed (0) | 0 to 255 | | 1 | 16 | 62.400 | 62.400 |
| | | | | | | 1 | 17 | 82.400 | 82.400 |
| | | | | | | 1 | 18 | 102.400 | 102.400 |
| | | | | | | 1 | 19 | 122.400 | 122.400 |
| | | | | | | 1 | 20 | 142.400 | 142.400 |
| | | | | | | 1 | 21 | 162.400 | 162.400 |
| | | | | | | 1 | 22 | 182.400 | 182.400 |
| | | | | | | 1 | 23 | 202.400 | 202.400 |
| Valve Flow Rate Setting (repetition of above value) | VFR | SISS Shot 11–18 | Valve Closed (0) | 0 to 255 | binary | 1 | 24 | 222.400 | 222.400 |
| | | | | | | 1 | 25 | 242.400 | 242.400 |
| | | | | | | 1 | 26 | 262.400 | 262.400 |
| | | | | | | 1 | 27 | 282.400 | 282.400 |
| | | | | | | 1 | 28 | 302.400 | 302.400 |
| | | | | | | 1 | 29 | 322.400 | 322.400 |
| | | | | | | 1 | 30 | 342.400 | 342.400 |
| | | | | | | 1 | 31 | 362.400 | 362.400 |
| Parity | PAR | SISS Shot 19 | No default is available | # of shots(−1) in this PTW(max = 19) | Ordinal Integer | 19 | 50 | 382.400 | 386.000 |
| SISS Record Duration | RD | Computed for each case | | 398.000 | Seconds | | | | |

TABLE 6

FIRST EXAMPLE OF APPLICATION OF PROJECT MENU FROM TABLE 5
Valve Setting is Commanded to be 90%

Settings

Example Project 1  
Unit Time Step is 200 msec  
LT is 12 seconds  
BT is 8 seconds  
PTW Interval is 15 minutes  
Next PTW at 8:00:00 AM  
SL is 9 seconds  
SP is 2 msec  
MINCC = 0.70

These parameters are not transmitted.

Example of Message Transmission

| Setting | Interpretation | Chosen Ordinal | Corresponding Shot Time | Observed Corr. Coeff. | Shot? | Weighted Corr. Coeff. | Observed Raw Times | Nearest Time in Model |
|---|---|---|---|---|---|---|---|---|
|  | Synchronization check | 1 | 0.000 | 0.850 | 1 | 0.85 | 0.002 | 0.000 |
| PM 1 | Project Menu 1 | 2 | 20.200 | 0.821 | 1 | 0.821 | 20.208 | 20.200 |
| VID = 3 | Valve Selected is #3 | 3 | 42.200 | 0.789 | 1 | 0.789 | 42.197 | 42.200 |
| 230 | Valve Flow Rate set at | 1 | 62.400 | 0.796 | 1 | 0.796 | 62.405 | 62.400 |
|  | 90% of maximum | 1 | 82.400 | 0.912 | 1 | 0.912 | 82.400 | 82.400 |
|  |  | 1 | 102.400 | 0.896 | 1 | 0.896 | 102.409 | 102.400 |
|  |  | 1 | 122.400 | 0.253 | 0 | 0 | NG | NG |
|  |  | 1 | 142.400 | 0.114 | 0 | 0 | NG | NG |
|  |  | 1 | 162.400 | 0.912 | 1 | 0.912 | 162.410 | 162.400 |
|  |  | 1 | 182.400 | 0.715 | 1 | 0.715 | 182.395 | 182.400 |
|  |  | 1 | 202.400 | 0.190 | 0 | 0 | NG | NG |
| 230 | Valve Flow Rate set at | 1 | 222.400 | 0.844 | 1 | 0.844 | 222.401 | 222.400 |
|  | 90% of maximum | 1 | 242.400 | 0.852 | 1 | 0.852 | 242.398 | 242.400 |
|  |  | 1 | 262.400 | 0.952 | 1 | 0.952 | 262.408 | 262.400 |
|  |  | 1 | 282.400 | 0.241 | 0 | 0 | NG | NG |
|  |  | 1 | 302.400 | 0.165 | 0 | 0 | NG | NG |
|  |  | 1 | 322.400 | 0.798 | 1 | 0.798 | 322.405 | 322.400 |
|  |  | 1 | 342.400 | 0.864 | 1 | 0.864 | 342.401 | 342.400 |
|  |  | 1 | 362.400 | 0.247 | 0 | 0 | NG | NG |
| PARITY | 13 shots not including this shot | 13 | 384.800 | 0.924 | 1 | 0.924 | 384.808 | 384.800 |
|  |  |  |  |  | 14 Shots Found | 0.8518 Average Corr. Coeff. |  |  |

These parameters are known by default by the Process Controller

Settings

Example Project 1  
Unit Time Step is 200 msec  
LT is 12 seconds  
BT is 8 seconds  
PTW Interval is 15 minutes  
Next PTW at 8:00:00 AM  
SL is 9 seconds  
SP is 2 msec

Example of Reception and Decoding of Message

| Delta to Model Times | Corrected Times | Delta to Model Times | Ordinal Calculation | Settings Calculation | Interpreted Settings |
|---|---|---|---|---|---|
| 0.002 | −0.001 | −0.001 | 1 | NA |  |
| 0.006 | 20.203 | 0.003 | 2 | PM 1 | Project Menu 1 |
| −0.003 | 42.194 | −0.006 | 3 | Valve 3 | Valve setting is for Valve 3 |
| 0.005 | 62.402 | 0.002 | 1 | shot (1) | Valve setting is 90% open |
| 0.000 | 82.397 | −0.003 | 1 | shot (1) | (decimal 230) |
| 0.009 | 102.406 | 0.006 | 1 | shot (1) | (binary 11100110) |
| NA | NA | NA | #VALUE! | no shot (0) |  |
| NA | NA | NA | #VALUE! | no shot (0) |  |
| 0.010 | 162.407 | 0.007 | 1 | shot (1) |  |
| −0.005 | 182.392 | −0.008 | 1 | shot (1) |  |
| NA | NA | NA | #VALUE! | no shot (0) |  |
| 0.001 | 222.398 | −0.002 | 1 | shot (1) | Valve setting is 90% open |
| −0.002 | 242.395 | −0.005 | 1 | shot (1) | (decimal 230) |
| 0.008 | 262.405 | 0.005 | 1 | shot (1) | (binary 11100110) |
| NA | NA | NA | #VALUE! | no shot (0) |  |
| NA | NA | NA | #VALUE! | no shot (0) |  |
| 0.005 | 322.402 | 0.002 | 1 | shot (1) |  |
| 0.001 | 342.398 | −0.002 | 1 | shot (1) |  |
| NA | NA | NA | #VALUE! | no shot (0) |  |
| 0.008 | 384.805 | 0.005 | 13 | Parity | Parity Checks OK |

TABLE 6-continued

FIRST EXAMPLE OF APPLICATION OF PROJECT MENU FROM TABLE 5
Valve Setting is Commanded to be 90%

| 0.003 | 0.00545 | | Std. Deviation is OK |
|---|---|---|---|
| Avg Delta 3.0 msec | Std Dev = 5.45 msec | 13 | Valve setting repeats OK |
| DAU Time Drift Est. | Std. Deviation is OK | Parity Checks OK | Avg. Corr. Coeff is .85 |
| Clock is 3.0 msec fast | | | Quality Standards Met |

TABLE 7

SECOND EXAMPLE OF APPLICATION OF PROJECT MENU FROM TABLE 5
Valve Setting is Commanded to be 100%

Settings

Example Project 1 — These parameters
Unit Time Step is 200 msec — are not transmitted.
LT is 12 seconds
BT is 8 seconds
PTW Interval is 15 minutes
Next PTW at 8:00:00 AM
SL is 9 seconds
SP is 2 msec
MINCC = 0.70

Example of Message Transmission

| Setting | Interpretation | Chosen Ordinal | Corresponding Shot Time | Observed Corr. Coeff. | Shot? | Weighted Corr. Coeff. | Observed Raw Times | Nearest Time in Model |
|---|---|---|---|---|---|---|---|---|
| | Synchronization check | 1 | 0.000 | 0.850 | 1 | 0.85 | 0.002 | 0.000 |
| PM 1 | Project Menu 1 | 2 | 20.200 | 0.821 | 1 | 0.821 | 20.206 | 20.200 |
| VID = 3 | Valve Selected is #3 | 3 | 42.200 | 0.789 | 1 | 0.789 | 42.197 | 42.200 |
| 255 | Valve Flow Rate set at | 1 | 62.400 | 0.796 | 1 | 0.796 | 62.405 | 62.400 |
| | 100% of maximum | 1 | 82.400 | 0.912 | 1 | 0.912 | 82.400 | 82.400 |
| | | 1 | 102.400 | 0.896 | 1 | 0.896 | 102.409 | 102.400 |
| | | 1 | 122.400 | 0.782 | 1 | 0.782 | 122.404 | 122.400 |
| | | 1 | 142.400 | 0.914 | 1 | 0.914 | 142.397 | 142.400 |
| | | 1 | 162.400 | 0.912 | 1 | 0.912 | 162.410 | 162.400 |
| | | 1 | 182.400 | 0.715 | 1 | 0.715 | 182.395 | 182.400 |
| | | 1 | 202.400 | 0.885 | 1 | 0.885 | 202.403 | 202.400 |
| 255 | Valve Flow Rate set at | 1 | 222.400 | 0.844 | 1 | 0.844 | 222.401 | 222.400 |
| | 100% of maximum | 1 | 242.400 | 0.852 | 1 | 0.852 | 242.398 | 242.400 |
| | | 1 | 262.400 | 0.952 | 1 | 0.952 | 262.408 | 262.400 |
| | | 1 | 282.400 | 0.612 | 1 | 0.812 | 282.408 | 282.400 |
| | | 1 | 302.400 | 0.863 | 1 | 0.863 | 302.400 | 302.400 |
| | | 1 | 322.400 | 0.798 | 1 | 0.798 | 322.405 | 322.400 |
| | | 1 | 342.400 | 0.884 | 1 | 0.864 | 342.401 | 342.400 |
| | | 1 | 362.400 | 0.758 | 1 | 0.758 | 362.405 | 362.400 |
| PARITY | 11 shots not incl this shot | 19 | 386.000 | 0.924 | 1 | 0.924 | 384.008 | 386.000 |
| | | | | | 20 Shots Identifi | 0.8470 Average Corr. Coeff. | | |

These parameters
are known by
default by the
Process Controller

Settings

Example Project 1
Unit Time Step is 200 msec
LT is 12 seconds
BT is 8 seconds
PTW Interval is 15 minutes
Next PTW at 8:00:00 AM
SL is 9 seconds
SP is 2 msec

Example of Reception and Decoding of Message

| Delta to Model Times | Corrected Times | Delta to Model Times | Ordinal Calculation | Settings Calculation | Interpreted Settings |
|---|---|---|---|---|---|
| 0.002 | −0.003 | −0.003 | 1 | NA | |
| 0.006 | 20.201 | 0.001 | 2 | PM 1 | Project Menu 1 |
| −0.003 | 42.192 | −0.008 | 3 | Valve 3 | Valve setting is for Valve 3 |
| 0.005 | 62.400 | 0.000 | 1 | shot (1) | Valve setting is 100% open |
| 0.000 | 82.395 | −0.005 | 1 | shot (1) | (decimal 255) |
| 0.009 | 102.404 | 0.004 | 1 | shot (1) | (binary 11111111) |
| 0.004 | 122.399 | −0.001 | 1 | shot (1) | |

TABLE 7-continued

SECOND EXAMPLE OF APPLICATION OF PROJECT MENU FROM TABLE 5
Valve Setting is Commanded to be 100%

| | | | | | |
|---|---|---|---|---|---|
| −0.003 | 142.392 | −0.008 | 1 | shot (1) | |
| 0.010 | 162.405 | 0.005 | 1 | shot (1) | |
| −0.005 | 182.390 | −0.010 | 1 | shot (1) | |
| 0.003 | 202.398 | −0.002 | 1 | shot (1) | |
| 0.001 | 222.396 | −0.004 | 1 | shot (1) | Valve setting is 100% open |
| −0.002 | 242.393 | −0.007 | 1 | shot (1) | (decimal 255) |
| 0.008 | 262.403 | 0.003 | 1 | shot (1) | (binary 11111111) |
| 0.006 | 282.401 | 0.001 | 1 | shot (1) | |
| 0.000 | 302.395 | −0.005 | 1 | shot (1) | |
| 0.005 | 322.400 | 0.000 | 1 | shot (1) | |
| 0.001 | 342.396 | −0.004 | 1 | shot (1) | |
| 0.005 | 362.400 | 0.000 | 1 | shot (1) | |
| 0.006 | 386.001 | 0.001 | 19 | Parity | Parity Checks OK |
| 0.005 | | 4.22 | | | Std. Deviation is OK |
| Avg Delta 5.0 msec | | Std Dev = 4.22 msec | 19 | | Valve setting repeats OK |
| DAU Time Drift Est. | | Std. Deviation is OK | Parity Checks OK | | Avg. Corr. Coeff. is .85 |
| Clock is 5.0 msec fast | | | | | Quality Standards Met |

TABLE 8

THIRD EXAMPLE OF APPLICATION OF PROJECT MENU FROM TABLE 5
Valve Setting is Commanded to be 90% but Error in Communication Occurs Settings Example Project 1
Unit Time Step is 200 msec
LT is 12 seconds
BT is 8 seconds
PTW Interval is 15 minutes
Next PTW at 8:00:00 AM
SL is 9 seconds
SP is 2 msec
MINCC = 0.70

These parameters are not transmitted.

Example of Message Transmission

| Setting | Interpretation | Chosen Ordinal | Corresponding Shot Time | Observed Corr. Coeff. | Shot? | Weighted Corr. Coeff. | Observed Raw Times | Nearest Time in Model |
|---|---|---|---|---|---|---|---|---|
| | Synchronization check | 1 | 0.000 | 0.754 | 1 | 0.754 | 0.002 | 0.000 |
| PM 1 | Project Menu 1 | 2 | 20.200 | 0.721 | 1 | 0.721 | 20.206 | 20.200 |
| VID = 3 | Valve Selected is #3 | 3 | 42.200 | 0.705 | 1 | 0.705 | 42.197 | 42.200 |
| 230 | Valve Flow Rate set at | 1 | 62.400 | 0.723 | 1 | 0.723 | 62.405 | 62.400 |
| | 90% of maximum | 1 | 82.400 | 0.652 | 0 | 0 | NG | NG |
| | | 1 | 102.400 | 0.711 | 1 | 0.711 | 102.409 | 102.400 |
| | | 1 | 122.400 | 0.253 | 0 | 0 | NG | NG |
| | | 1 | 142.400 | 0.114 | 0 | 0 | NG | NG |
| | | 1 | 162.400 | 0.745 | 1 | 0.745 | 162.410 | 162.400 |
| | | 1 | 182.400 | 0.772 | 1 | 0.772 | 182.395 | 182.400 |
| | | 1 | 202.400 | 0.190 | 0 | 0 | NG | NG |
| 230 | Valve Flow Rate set at | 1 | 222.400 | 0.762 | 1 | 0.762 | 222.401 | 222.400 |
| | 90% of maximum | 1 | 242.400 | 0.752 | 1 | 0.752 | 242.398 | 242.400 |
| | | 1 | 262.400 | 0.799 | 1 | 0.799 | 262.408 | 262.400 |
| | | 1 | 282.400 | 0.241 | 0 | 0 | NG | NG |
| | | 1 | 302.400 | 0.165 | 0 | 0 | NG | NG |
| | | 1 | 322.400 | 0.798 | 1 | 0.798 | 322.405 | 322.400 |
| | | 1 | 342.400 | 0.721 | 1 | 0.721 | 342.401 | 342.400 |
| | | 1 | 362.400 | 0.247 | 0 | 0 | NG | NG |
| PARITY | 13 shots not including this shot | 13 | 384.800 | 0.758 | 1 | 0.756 | 384.807 | 384.800 |
| | | | | | 13 Shots Identifi | 0.7476 Average Corr. Coeff. | | |

These parameters
are known by
default by the
Process Controller

Settings

Example Project 1
Unit Time Step is 200 msec
LT is 12 seconds
BT is 8 seconds
PTW Interval is 15 minutes
Next PTW at 8:00:00 AM
SL is 9 seconds
SP is 2 msec TABLE 8-continued THIRD EXAMPLE OF APPLICATION OF PROJECT MENU FROM TABLE 5
Valve Setting is Commanded to be 90% but Error in Communication Occurs

| | | Example of Reception and Decoding of Message | | | |
|---|---|---|---|---|---|
| Delta to Model Times | Corrected Times | Delta to Model Times | Ordinal Calculation | Settings Calculation | Interpreted Settings |
| 0.002 | −0.001 | −0.001 | 1 | NA | |
| 0.006 | 20.203 | 0.003 | 2 | PM 1 | Project Menu 1 |
| −0.003 | 42.194 | −0.006 | 3 | Valve 3 | Valve setting is for Valve 3 |
| 0.005 | 62.402 | 0.002 | 1 | shot (1) | Valve setting is 65% open |
| #VALUE! | NA | NA | #VALUE! | shot (0) | (decimal 166) |
| 0.009 | 102.406 | 0.008 | 1 | shot (1) | (binary 10100110) |
| #VALUE! | NA | NA | #VALUE! | no shot (0) | |
| #VALUE! | NA | NA | #VALUE! | no shot (0) | |
| 0.010 | 162.407 | 0.007 | 1 | shot (1) | |
| −0.005 | 182.392 | −0.008 | 1 | shot (1) | |
| #VALUE! | NA | NA | #VALUE! | no shot (0) | |
| 0.001 | 222.398 | −0.002 | 1 | shot (1) | Valve setting is 90% open |
| −0.002 | 242.395 | −0.005 | 1 | shot (1) | (decimal 230) |
| 0.008 | 262.405 | 0.005 | 1 | shot (1) | (binary 11100110) |
| #VALUE! | NA | NA | #VALUE! | no shot (0) | |
| #VALUE! | NA | NA | #VALUE! | no shot (0) | |
| 0.005 | 322.402 | 0.002 | 1 | shot (1) | |
| 0.001 | 342.398 | −0.002 | 1 | shot (1) | |
| #VALUE! | NA | NA | #VALUE! | no shot (0) | |
| 0.007 | 386.804 | 0.004 | 13 | Parity | Parity Check is not OK |
| 0.003 | | 0.005740416 | | | Std. Deviation is OK |
| Avg Delta 3.0 msec | | Std Dev = 5.74 msec | 12 | | Valve setting does not repeat |
| DAU Time Drift Est. | | Std. Deviation is OK | Parity Check | | Avg. Corr. Coeff. .75 |
| Clock is 3.0 msec fast | | | is not OK!! | | Quality Standards Failed |

What is claimed is:

1. A seismic communication system suitable to communicate information to an underground location, comprising:
a substantially repeatable seismic source at a fixed site to transmit information to said underground location by generation of a series of nearly identical seismic shots at selected times, said series of seismic shots including a reference shot at a first time;
a seismic receiver at said underground location to receive said series of seismic shots; and,
a processor in communication with said seismic receiver, said processor measuring shot times based on said reference shot to decipher said information from said series of seismic shots.

2. The seismic communication system of claim 1, wherein individual shots of said series of shots are at selected times corresponding to said transmitted information and said processor is programmed to translate said times into said transmitted information.

3. The processor of claim 2, wherein said processor translates said times by a project menu correlating said times to preselected instructions.

4. The seismic communication system of claim 1, wherein said processor cross-correlates a first seismic shot with a second seismic shot to establish a time measurement of the second shot.

5. The seismic communication system of claim 4, wherein said first seismic shot is constructed by combining two or more seismic shots that occur earlier in time than said second seismic shot.

6. The seismic communication system of claim 1, wherein there is a first potential shot time occurring at a preselected time after said reference shot, wherein said processor employs a binary communication protocol so that a seismic shot at said first potential shot time communicates a first bit of datum to said processor, and the absence of a seismic shot at said first potential shot time communicates a second bit of datum to said processor.

7. The seismic communication system of claim 1, wherein a first seismic shot of said series of seismic shots is said reference shot, and a second seismic shot occurs at a preselected time that is after said first shot, said processor employing a communication protocol such that the information communicated to said processor depends on the magnitude of said preselected time.

8. The seismic communication system of claim 1, further comprising:
a clock subject to clock drift, said clock being underground in association with said processor.

9. The seismic communication system of claim 8, wherein a subsequent shot to said reference shot is at a preselected time later, said processor accounting for said clock drift by computing a difference between said preselected time and a measured arrival time of said subsequent shot at said seismic receiver.

10. The seismic communication system of claim 1, wherein said system includes one or more geophones.

11. The seismic communication system of claim 1, wherein said system includes one or more hydrophones.

12. The seismic communication system of claim 1, further comprising:
a perforating gun in association with said processor, said perforating gun having numerous explosive charges subject to detonation.

13. The seismic communication system of claim 12, wherein said processor detonates said explosive charges in response to said transmitted information.

14. The seismic communication system of claim 13, further comprising:
at least one surface seismic receiver, wherein said detonation of said explosive charges creates seismic detonation waves, said surface seismic receiver detecting said seismic detonation waves.

15. The seismic communication system of claim 14, wherein a surface processor determines the approximate proportion of explosive charges that detonated based on said detection of said seismic waves by said surface seismic receiver.

16. The seismic communication system of claim 14, wherein said seismic detonation waves received at said seismic receiver are analyzed to estimate if fewer than all of said explosive charges detonated.

17. The seismic communication system of claim 1, wherein said seismic receiver is attached to one or more locking arms suitable for connection to a borehole wall.

18. The seismic communication system of claim 1, wherein said system includes a plurality of Vibroseis sources.

19. The seismic communication system of claim 1, wherein said system includes a plurality of airgun sources.

20. The seismic communication system of claim 1, wherein said series of seismic shots include communication shots and command shots.

21. The seismic communication system of claim 1, wherein said seismic source is positioned on the surface of the earth.

22. The seismic communication system of claim 1, wherein said seismic source is comprised of multiple seismic sources that are operated from a plurality of fixed sites.

23. The seismic communication system of claim 1, wherein said seismic source is positioned underground.

24. The seismic communication system of claim 1, wherein said seismic source is a dynamically positionable source.

25. The seismic communication system of claim 1, further comprising at least one monitoring seismic receiver, said monitoring seismic receiver not in connection with said processor.

26. The seismic communication system of claim 25, wherein said monitoring seismic receiver is at a sub-surface location.

27. The seismic communication system of claim 25, wherein said monitoring seismic receiver is not at a sub-surface location.

28. A method to transmit information to a device in a borehole, comprising:
(a) generating a first seismic signal at a predetermined time at a first location, said seismic signal being a reference signal;
(b) receiving said first seismic signal at said device in said borehole;
(c) generating a nearly identical second seismic signal from said first location at a subsequent predetermined time after said first seismic signal;
(d) receiving said second seismic signal at said device in said borehole at said subsequent predetermined time after receiving said first signal;
(e) measuring the initiation time of the second seismic signal; and,
(f) determining information from the measured initiation time by said device.

29. The method of claim 28, further comprising:
(g) transmitting a plurality of seismic signals after said second seismic signals wherein said information is an instruction based on said first, said second, and said plurality of seismic signals.

30. The method of claim 28, further comprising:
(g) correcting for the clock drift of a clock associated with said device based on said measured initiation time.

31. The method of claim 28, wherein said device is a logging tool.

32. The method of claim 28, wherein said device includes a perforating gun.

33. The method of claim 28, further comprising:
(g) activating a valve based on said information.

34. The method of claim 32, wherein said information forms at least a portion of a detonate command for said perforating gun.

35. The method of claim 28, further comprising:
(g) listening for seismic signals from said device.

36. The method of claim 35, wherein said device is a perforating gun and wherein said information forms at least a portion of a detonate command for said perforating gun.

37. The method of claim 28, wherein said determining step includes the cross-correlation of said first seismic signal and said second seismic signal.

38. A method to interpret seismic signals comprising:
(a) receiving a first seismic signal at an underground location;
(b) waiting until a predetermined time based on an underground clock;
(c) listening for the presence of a subsequent seismic signal that is nearly identical to said first seismic signal at about said predetermined time; and
(d) determining information from said listening step.

39. The method of claim 38 wherein said determination of information yields the value of a bit.

40. The method of claim 38 wherein said information is determined from a plurality of subsequent seismic signals and listening steps to provide a string of bits that correspond to an instruction according to a predetermined code.

41. The method of claim 40 wherein said instruction is a detonate command for transmission to a perforating gun in a borehole.

42. The method of claim 40 wherein said instruction is to a tool in a borehole.

43. The method of claim 40 wherein said information is a coded command interpretable by reference to a project menu stored in memory.

44. The method of claim 40 further comprising the step of accounting for the clock drift of an underground clock based upon a time difference between the measured times of said subsequent seismic signals and said predetermined times.

45. The method of claim 40 further comprising the step of cross-correlating a detected seismic signal at a time proximate with said predetermined time and said first seismic signal.

46. The method of claim 40 wherein said first and said subsequent seismic signals are all generated at the same fixed surface location.

47. The method of claim 40 wherein said subsequent seismic signals must arrive in time windows defined by said predetermined times and a maximum calculated clock drift of an associated underground clock.

* * * * *